(12) United States Patent
Ramani et al.

(10) Patent No.: US 7,108,842 B2
(45) Date of Patent: Sep. 19, 2006

(54) PROCESS FOR THE CATALYTIC PARTIAL OXIDATION OF $H_2S$ USING STAGED ADDITION OF OXYGEN

(75) Inventors: Sriram Ramani, Ponca City, OK (US); Alfred E. Keller, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 227 days.

(21) Appl. No.: 10/758,465

(22) Filed: Jan. 15, 2004

(65) Prior Publication Data
US 2005/0158235 A1 Jul. 21, 2005

(51) Int. Cl.
*C01B 17/04* (2006.01)

(52) U.S. Cl. .................. 423/573.1; 423/576.8

(58) Field of Classification Search ........... 423/573.1, 423/576.2, 576.8
See application file for complete search history.

(56) References Cited

U.S. PATENT DOCUMENTS

| | | | |
|---|---|---|---|
| 1,930,716 A | 10/1933 | Jaegar | 260/57 |
| 2,963,348 A | 12/1960 | Sellers | 23/225 |
| 4,038,036 A | 7/1977 | Beavon | 23/262 |
| 4,197,277 A | 4/1980 | Sugier et al. | 423/231 |
| 4,219,445 A | 8/1980 | Finch | 252/443 |
| 4,271,041 A | 6/1981 | Boudart | 252/438 |
| 4,279,882 A | 7/1981 | Beavon | 423/574 |
| 4,311,683 A | 1/1982 | Hass et al. | 423/573 |
| 4,325,842 A | 4/1982 | Slaugh | 252/443 |
| 4,325,843 A | 4/1982 | Slaugh | 252/443 |
| 4,326,992 A | 4/1982 | Slaugh | 252/443 |
| 4,331,544 A | 5/1982 | Takaya | 252/443 |
| 4,406,873 A | 9/1983 | Beavon | 423/574 |
| 4,481,181 A | 11/1984 | Norman | 423/573 |
| 4,596,699 A * | 6/1986 | Desgrandchamps et al. | 422/160 |
| 4,814,159 A | 3/1989 | Voirin | 423/574 |
| 4,886,649 A | 12/1989 | Ismagilov | 423/230 |
| 4,889,701 A | 12/1989 | Jones et al. | 423/220 |
| 4,891,187 A | 1/1990 | Jungfer et al. | 423/248 |
| 4,988,494 A | 1/1991 | Lagas et al. | 423/574 |
| 5,232,467 A | 8/1993 | Child et al. | 48/127.3 |
| 5,338,716 A | 8/1994 | Triplett | 502/64 |
| 5,397,556 A | 3/1995 | Towler et al. | 423/220 |
| 5,451,557 A | 9/1995 | Sherif | 502/177 |
| 5,512,260 A | 4/1996 | Kiliany et al. | 423/242.1 |
| 5,573,991 A | 11/1996 | Sherif | 502/177 |
| 5,597,546 A | 1/1997 | Li et al. | 423/573.1 |

(Continued)

FOREIGN PATENT DOCUMENTS

EP    842894    5/1998

(Continued)

OTHER PUBLICATIONS

S.W. Chun et al., Selective oxidation of $H_2S$ to elemental sulfur over $TiO_2/SiO_2$ catalysts, *Applied Catalysis B: Environmental* 16:235-243 (1998).

(Continued)

*Primary Examiner*—Stanley S. Silverman
*Assistant Examiner*—Timothy C. Vanoy
(74) *Attorney, Agent, or Firm*—Conley Rose PC

(57) ABSTRACT

A multistage oxygen-added catalytic partial oxidation process and apparatus for converting $H_2S$ in an acid gas stream to elemental sulfur and water are disclosed. Each staged addition of oxygen or air at the top of the catalyst bed and at points along the catalyst bed maintain oxygen-limited $H_2S$ catalytic partial oxidation conditions whereby incidental $SO_2$ production is minimized.

36 Claims, 3 Drawing Sheets

U.S. PATENT DOCUMENTS

| | | | |
|---|---|---|---|
| 5,603,913 A | 2/1997 | Alkhazov | 423/230 |
| 5,639,929 A | 6/1997 | Bharadwaj et al. | 585/658 |
| 5,648,582 A | 7/1997 | Schmidt | 585/652 |
| 5,653,953 A | 8/1997 | Li et al. | 423/576.8 |
| 5,654,491 A | 8/1997 | Goetsch | 568/469.9 |
| 5,676,921 A | 10/1997 | Heisel et al. | 423/573.1 |
| 5,700,440 A | 12/1997 | Li | 423/231 |
| 5,720,901 A | 2/1998 | De Jong et al. | 252/373 |
| 5,807,410 A | 9/1998 | Borsboom | 23/293 |
| 5,814,293 A | 9/1998 | Terorde et al. | 423/576 |
| 5,891,415 A | 4/1999 | Alkhazov et al. | 423/573.1 |
| 5,897,850 A | 4/1999 | Borsboom | 423/576.2 |
| 5,985,178 A | 11/1999 | Long et al. | 252/373 |
| 6,017,507 A | 1/2000 | Nougayrede et al. | 423/573.1 |
| 6,083,471 A | 7/2000 | Philippe et al. | 423/573.1 |
| 6,099,819 A | 8/2000 | Srinivas et al. | 423/573.1 |
| 6,103,206 A | 8/2000 | Taylor, Jr. et al. | 423/210 |
| 6,372,193 B1 | 4/2002 | Ledoux et al. | 423/573.1 |
| 6,403,051 B1 * | 6/2002 | Keller | 423/573.1 |
| 6,447,745 B1 | 9/2002 | Feeley | 423/648.1 |
| 6,579,510 B1 | 6/2003 | Keller | 423/573.1 |
| 6,602,478 B1 | 8/2003 | Brundage | 422/194 |
| 6,726,850 B1 | 4/2004 | Reyes et al. | 252/373 |
| 6,780,392 B1 * | 8/2004 | Gross et al. | 423/576.8 |
| 6,800,269 B1 * | 10/2004 | Keller et al. | 423/576.2 |
| 6,946,111 B1 * | 9/2005 | Keller et al. | 423/576.2 |
| 2002/0098145 A1 * | 7/2002 | Borsboom et al. | 423/576.8 |

FOREIGN PATENT DOCUMENTS

| | | |
|---|---|---|
| WO | 9421358 | 9/1994 |
| WO | 02006154 | 1/2002 |

OTHER PUBLICATIONS

B.W. Gamson and R.H. Elkins, Sulfur from Hydrogen Sulfide, *Chem. Eng. Prog. 4:* 9: 203-215, 1953.

R.H. Hass, et al, Process meets sulfur recovery needs, *Hydrocarbon Processing* 104-107 (1981).

J.B. Hyne, Methods for desulfurization of effluent gas streams, *Oil & Gas Journal*, 64-78 (1972).

Z.R. Ismagilov, et al, New Catalysts and Processes For Environment Protection, *React. Kinet. Catal. Left.*, vol. 55, No. 2, 489-499 (1995).

Richard K. Kerr, et al, A new sulfur-recovery process: the RSRP, *Oil & Gas Journal* 230-243 (1982).

J.A. Lagas, et al, Selective-oxidation catalyst improves Claus process, *Oil & Gas Journal,* 68-71 (1988).

Kuo-Tseng Li and Ni-Shen Shyu, Catalytic Oxidation of Hydrogen Sulfide to Sulfur on Vanadium Antimonate, *Ind. Eng. Chem. Res.* 1480-1484 (1997).

S. Tummala, Staged Catalysts for Millisecond Contact Time Reactions, a Thesis Submitted to the Faculty of the Graduate School of the University of Minnesota, Sep. 2000, http://www.rz.uni-karlsruhe.de/~cf01/download/docs/doc_02_Tummala_PhDThesis.pdf.

R.W. Watson, et al., The Successful Use of Oxygen in Claus Plants, *HTI Quarterly:* Winter 1994/1996, pp. 95-101.

PCT Search Report in PCT/US05/01027 dated Dec. 14, 2005.

* cited by examiner

PROCESS FOR THE CATALYTIC PARTIAL OXIDATION OF H₂S USING STAGED ADDITION OF OXYGEN

BACKGROUND OF THE INVENTION

1. Technical Field of the Invention

The present invention generally relates to sulfur recovery processes and to apparatus for removing sulfur from $H_2S$-containing gas streams and producing elemental sulfur. More particularly, the invention relates to $H_2S$ catalytic partial oxidation processes that include staged addition of oxygen, and to apparatus for carrying out such processes.

2. Description of the Related Art

Sulfur removal from $H_2S$-containing gas streams is a field of endeavor that is receiving a great deal of attention today, particularly in the petroleum industry. Considerable quantities of $H_2S$ are created from the refining of petroleum in processes such as crude oil hydrodesulfurization, gasification of coal and desulfurization of natural gas. The removal of sulfur from natural gas is a particular concern because utilization of the enormous supply of natural gas existing in underground reservoirs all over the world is hindered due to the presence of naturally-occurring $H_2S$ along with the methane and other light hydrocarbons that make up natural gas. Some natural gas formations contain only a relatively small concentration of $H_2S$, yet even those types of natural gas wells typically remain shut-in today because the cost of removal of the $H_2S$ using existing methods and apparatus exceeds the market value of the gas. A further deterrent to full utilization of $H_2S$-containing natural gas resources is the corrosive effect of the $H_2S$ component of liquefied natural gas on the transportation pipes and storage vessels that are needed to bring the $H_2S$-containing natural gas from remote locations to existing sulfur treatment plants.

The removal of sulfur from naturally occurring and industrially produced $H_2S$-containing gas streams is necessitated by the high demand for clean energy sources, and by increasingly stringent clean air standards for industrial emissions that restrict or prohibit the release of $H_2S$ into the environment due to its high toxicity and foul odor. Since the amount of sulfur recovered from an industrial $H_2S$-containing stream may be quite large, the elemental sulfur product can have significant commercial value.

Many processes have been described for accomplishing the removal and recovery of sulfur from $H_2S$-containing gases. The sulfur plants in common use today employ a modification of a process that was developed over 200 years ago in which $H_2S$ was reacted over a catalyst with air (oxygen) to form elemental sulfur and water (the Claus process). Sulfur recovery was low and the highly exothermic reaction was difficult to control. Modified Claus processes were introduced to overcome the deficiencies of the original Claus process, and today are generally referred to as "Claus Processes." In a conventional Claus process, the $H_2S$-containing gas stream is contacted with air or a mixture of oxygen and air in a flame. One third (⅓) of the $H_2S$ is burned according to the equation:

$$H_2S + \tfrac{3}{2} O_2 \rightarrow SO_2 + H_2O \tag{1}$$

The remaining ⅔ of the $H_2S$ is converted to sulfur via the (Claus) reaction:

$$2H_2S + SO_2 \leftrightarrows 3/x\, S_x + 2H_2O \tag{2}$$

(x=2, 6, or 8 depending on temperature and pressure). The gases are cooled in a fire tube boiler after the burner. Typically, this step converts 55 to 70% of the $H_2S$ to elemental sulfur. The equilibrium of the reaction of equation (2), referred to as the "Claus reaction," limits the conversion. To improve the yield, elemental sulfur is condensed from the gas stream. After sulfur condensation and separation from the liquid sulfur, the unreacted gases are heated to the desired temperature, passed over a catalyst that promotes the Claus reaction, and cooled again to condense and separate the sulfur. Generally, two to three stages of Claus reheater, reactor, and condenser stages are employed. Over the years, most of the modifications to the Claus process have involved improvement of burner design, use of more active and durable catalysts, and use of different types of reheaters. Anywhere from 90 to 98% of the $H_2S$ fed to the unit is recovered as elemental sulfur. Any remaining $H_2S$, $SO_2$, sulfur, or other sulfur compounds in the Claus plant effluent are either incinerated to $SO_2$ and discharged to the atmosphere, or incinerated to $SO_2$ and absorbed by chemical reaction, or converted by hydrogen to $H_2S$ and recycled or absorbed by an alkanolamine solution. This is accomplished by various Claus "tail gas" treatment units, which improve the efficiency of sulfur removal from the gas discharged to the atmosphere.

Claus processes are generally efficient for processing large quantities of gases containing a high concentration (i.e., >40 vol. %) $H_2S$ in plants producing more than 100,000 tons of sulfur per year. The Claus-type processes are not suitable for use in cleaning up hydrogen or light hydrocarbon gases (such as natural gas) that contain $H_2S$, however. Not only is the hydrocarbon content lost in the initial thermal combustion step of the Claus process, but carbon, carbonyl sulfide and carbon disulfide byproducts cause catalyst fouling and dark sulfur. Moreover, carbonyl sulfide is difficult to convert to elemental sulfur. In the past, others have usually addressed the problem of purifying hydrogen sulfide contaminated hydrogen or gaseous light hydrocarbon resources by employing an initial amine extraction technique.

Typically, alkanolamine absorption of the $H_2S$ component of a gas stream is performed, followed by $H_2S$ regeneration and conventional multistage Claus sulfur recovery, usually including tail gas treatments. According to conventional industrial practices, a hydrocarbon or hydrogen containing gas stream containing a low concentration of $H_2S$ is contacted with a water solution containing an alkanolamine. Alkanolamines commonly employed in the industry are monoethanolamine (MEA), diethanolamine (DEA), methyldiethanol amine (MDEA), diglycolamine (DGA), and diisopropanolamine (DIPA). These are basic nitrogen compounds. The basic alkanolamine reacts with the $H_2S$ and other gases that form acids when dissolved in water to form alkanolamine salts, according to the following generic reaction:

Alkanolamine+Acid Gas=Protonated alkanolamine+ weak acid anion

When ethanolamine is the basic alkanolamine, the reaction is:

$$H_2N-CH_2CH_2OH+H_2S \rightarrow {}^+NH_3-CH_2CH_2OH+HS^- \quad (3)$$

The hydrogen or hydrocarbon gas, substantially freed of $H_2S$, is recovered and may be used as fuel or routed to another system for processing. After absorbing the $H_2S$ from the gas, the alkanolamine solution is transported, heated, and placed in a stripping tower. Steam generated from boiling the alkanolamine solution at the bottom of the stripping tower, lowers the vapor pressure of the acid gas above the solution, reversing the equilibrium of the acid gas/alkanolamine reaction described above. The acid gases leaving the stripper are cooled to condense most of the remaining steam. The acid gas stream then goes to a Claus sulfur recovery plant, as described above.

The major problem with the Claus process is the inherent equilibrium constraint of the Claus reaction caused by the necessity of generating the $SO_2$ intermediate. Others have addressed this problem by attempting to directly oxidize $H_2S$ to sulfur using alumina based catalysts and low temperature operating conditions. SUPERCLAUS™ processes such as the STRETFORD™ process are examples of low temperature direct oxidation methods. Typically, these processes are catalytic oxidations operating at temperatures below about 454° C., so that the reaction can be contained in ordinary carbon steel vessels. Usually these catalytic oxidation processes are limited to Claus tail gas operations or sulfur recovery from streams that have very low $H_2S$ content (i.e., about 1–3%). One reason for this limited use is that the heat evolved from the oxidation of a concentrated stream of $H_2S$ would drive the reaction temperatures well above 454° C. requiring refractory lined vessels such as the conventional Claus thermal reactor. Low concentration $H_2S$ streams will not produce enough energy release from oxidation to sustain a flame as in a thermal reactor stage. The existing catalytic oxidation technologies are thus limited to low concentration $H_2S$-containing streams using non-refractory lined vessels. Existing processes are also limited in the amount of sulfur that can be handled because the heat transfer equipment needed to remove the heat of reaction becomes extremely large due to the low temperature differential between the process and the coolant streams.

Some techniques for improving efficiency of sulfur removal that have been described in the literature for purifying hydrogen sulfide contaminated hydrogen or gaseous light hydrocarbon resources include: 1) adsorbing sulfur cooled below the freezing point on a solid material followed by releasing the trapped sulfur as a liquid by heating the solid adsorbent; 2) selectively oxidizing the remaining $H_2S$ to sulfur using air; and 3) selectively oxidizing the $H_2S$ to sulfur employing aqueous redox chemistry utilizing chelated iron salts or nitrite salts. According to the latter methods, the $H_2S$-contaminated hydrogen or hydrocarbon stream is contacted directly with the redox reagent such as chelated iron (III) ions. The iron (III) is reduced to iron (II) ion while the $H_2S$ is converted to elemental sulfur. The sulfur in liquid form is separated from the solution. These types of desulfurization units have been shown to be practical when the amount of sulfur to be removed from the stream is below 5 long tons per day. The SULFUROX™ and LO-CAT™ processes are examples of this type of $H_2S$ conversion process. Some of these direct oxidation processes use a liquid medium to carry out the oxidation or to act as a carrier for the oxidizer. These processes are also limited in the amount of sulfur recovered due to the heat removal constraints at low temperatures and the need to maintain low temperatures to keep the liquid from boiling. For at least these reasons, existing direct oxidation processes have not proved to be viable substitutes for the Claus process in most industrial applications.

U.S. Pat. No. 5,700,440, U.S. Pat No. 5,807,410 and U.S. Pat. No. 5,897,850 describe some of the limitations of existing tail gas treatment (TGT) processes and the difficulty of meeting increasingly stringent government requirements for desulfurization efficiency in the industry. J. B. Hyne (*Oil and Gas Journal* Aug. 28, 1972: 64:78) gives an overview of available processes for effluent gas stream desulfurization and discusses economical and environmental considerations. R. H. Hass et al. (*Hydrocarbon Processing* May 1981:104–107) describe the BSR/Selectox™ process for conversion of residual sulfur in Claus tail gas or for pre-Claus treatment of a gas stream. K-T Li at al. (*Ind. Eng. Chem. Res.* 36:1480–1484 (1997)) describe the SuperClaus™ TGT system which uses vanadium antimonate catalysts to catalyze the selective oxidation of hydrogen sulfide to elemental sulfur.

U.S. Pat. No. 5,603,913 describes several oxide catalysts that have been suggested for catalyzing the reaction $$H_2S+\tfrac{1}{2}O_2 \rightarrow \tfrac{1}{2}S_2+H_2O \quad (4)$$

Because reaction (4) is not a thermodynamically reversible reaction, direct oxidation techniques offer potentially higher levels of conversion than is typically obtainable with thermal and catalytic oxidation of $H_2S$. As mentioned above, conventional direct oxidation methods are applicable to sour gas streams containing relatively small amounts of $H_2S$ and large amounts of hydrocarbons, but are not particularly well suited for handling more concentrated acid gas streams from refineries. For this reason direct oxidation methods have been generally limited to use as tail gas treatments only, and have not found general industrial applicability for first stage sulfur removal systems from gases containing large quantities of $H_2S$.

U.S. Pat. No. 6,372,193 (Ledoux et al.) describes a process for catalytically oxidizing a gas stream containing a low concentration (up to 25 vol. %) $H_2S$ directly to sulfur over a catalytically active phase carried on a silicon carbide-based support. The catalytically active phase is an oxysulfide of Fe, Cu, Ni, Co, Cr, Mo or W.

Even though the Claus process still finds widespread industrial use today for recovering elemental sulfur from $H_2S$ that is generated in many industrial processes, such as petroleum refinery processes, and for reducing sulfur emissions from refineries, the Claus process is generally viewed as relatively costly for routine use on a commercial scale. As a result, the Claus process is currently performed mainly for the purpose of complying with government mandated environmental air quality standards. Most of the existing alternative desulfurization processes and systems must resort to use of a number of additional pre-treatments or post-treatment catalytic stages and tail gas treatment units (TGTUs) in order to adequately clean the waste gas that is vented into the air sufficiently to meet current environmental regulations for venting of cleaned $H_2S$-containing gas streams. Multi-stage tail gas treating units (TGTUs) typically convert the $H_2S$ that did not react in the Claus unit to elemental sulfur by (a) oxidizing completely to $SO_2$, (b) reacting the $SO_2$ with $H_2S$ in smaller concentrations to form elemental sulfur ($S^o$), and (c) reacting very small concentrations of $H_2S$ with oxygen to form $S^o$ at low temperatures using a catalyst. A number of TGTUs are usually needed to achieve the 99+% conversion of $H_2S$ to $S^o$, and involves a large initial investment and appreciable maintenance costs.

Significant capital and maintenance costs are associated with conventional multi-stage treatment units. More economical and efficient ways of recovering elemental sulfur from an $H_2S$-containing gas stream and of removing environmentally harmful $H_2S$ from industrial vent stack exhaust gases are needed. Conventional desulfurization operations are also not practical for use at small operations such as remote well sites or on natural gas producing off shore oil platforms.

The basic SPOC™ technology, as described in co-owned U.S. patent application Ser. No. 09/625,710 (abandoned), Ser. No. 10/024,679 (U.S. Pat. No. 6,946,111) and Ser. No. 10/024,167 (U.S. Pat. No. 6,800,269), which are hereby incorporated herein by reference, provides an alternative to the conventional Claus process to handle $H_2S$-containing fluid streams. U.S. Pat. Nos. 6,946,111 and 6,800,269 (Keller et al.) describe a method of selectively converting even high concentrations of hydrogen sulfide in $H_2S$-containing gas streams to elemental sulfur via a short contact time catalytic partial oxidation process (SPOC™) that is more economic and efficient than a Claus type process. The process is carried out in a more compact system than a conventional Claus plant. Conversion of $H_2S$ to elemental sulfur by the SPOC™ process may be accompanied by the formation of some $SO_2$ as a result of gas-phase reactions between $S^o$ and $O_2$ that occur both downstream from the catalyst zone and within the catalyst zone. This secondary production of $SO_2$ is typically observed when higher than stoichiometric $O_2/H_2S$ ratios are used to increase the $H_2S$ conversion. An apparatus and process that further improve the conversion of $H_2S$ to elemental sulfur would be valuable in the art, particularly for meeting stringent Federal environmental standards and the demands for cleaner industrial waste gas emissions as required by the Environmental Protection Agency.

BRIEF SUMMARY OF PREFERRED EMBODIMENTS

The present invention provides a process and apparatus in which $H_2S$-containing streams, with $H_2S$ concentrations ranging from very low to high (e.g., about 1% to 100% (by volume)), are converted to elemental sulfur and water. The basic SPOC™ process has been modified to improve the total $H_2S$ conversion and the amount of $S^o$ recovered. The improvement includes staged air, oxygen or oxygen-enhanced air addition to the reactor whereby the amount of oxygen added to the front of the catalyst bed is such that $SO_2$ formation is minimized, preferably, no more than 10% of the sulfur in the feed is converted to $SO_2$. Since this also limits the $H_2S$ conversion, the oxygen is added along the catalyst bed in smaller than stoichiometric oxygen/$H_2S$ ratios to achieve higher overall $H_2S$ conversion and $S^o$ yields, and lower $SO_2$ yields. The reactor is still operated in short contact time mode (i.e., 200 milliseconds or less). $H_2S$ is converted to $S^o$ by the catalytic partial oxidation of $H_2S$ according to the reaction

$$H_2S + \tfrac{1}{2}O_2 \rightarrow \tfrac{1}{2}S_x + H_2O \qquad (5)$$

(wherein x=2, 6 or 8, depending on temperature and pressure). The total or nearly complete conversion of the $H_2S$ component to elemental sulfur is achieved, and the yield of recovered elemental sulfur is thereby enhanced. Since complete oxidation to $SO_2$ also increases the reaction temperature, staged oxygen addition at sub-stoichiometric oxygen/$H_2S$ ratios will help minimize the undesired reactions occurring as a result of high temperatures. Also, it is possible to reduce the total amount of oxygen used in the process without making any other changes to the catalyst composition or overall process.

The new staged air/oxygen catalytic partial oxidation process and system (termed SPOC-III™) offers significant advantages for more efficiently recovering elemental sulfur from $H_2S$-containing streams and for reducing pollution of the air by $H_2S$ from natural gas wells or emissions from petroleum refinery vent stacks, compared to conventional sulfur recovery systems. Another advantage of the present apparatus and process is that it is possible to make a relatively compact sulfur removal plant. The new apparatus and process also make it more economically and environmentally feasible for refineries to utilize high sulfur crude oils by providing for the efficient recovery of sulfur from the accompanying $H_2S$ waste gas.

Employing a short contact time reactor and a suitable catalyst, the process allows the direct oxidation of $H_2S$ to take place on gas streams containing a much wider range of $H_2S$ concentrations than is presently possible with conventional $H_2S$ direct oxidation processes and operating at temperatures ranging up to about 1,500° C. In accordance with one aspect of the present invention, a multistage catalytic partial oxidation process for recovering elemental sulfur from a $H_2S$-containing gas stream is provided. In certain embodiments, the process comprises contacting the $H_2S$-containing gas stream with a catalyst that is active for catalyzing the partial oxidation of $H_2S$ in the presence of oxygen to form $S^o$ and $H_2O$, the catalyst comprising multiple catalytic regions. This process also includes providing the total stoichiometric amount of oxygen required for the catalytic partial oxidation of the $H_2S$ in the $H_2S$-containing gas stream to $S^o$ and $H_2O$ in at least two increments, respectively, to at least two of the catalyst regions, such that a product gas mixture is formed comprising $S^o$ and $H_2O$. Preferably, overall selectivity for $SO_2$ product is no more than 10%, more preferably the production of incidental $SO_2$ is restricted to less than 5% of the sulfur content of the starting $H_2S$ feed. Elemental sulfur is condensed from the product gas mixture.

In certain embodiments, the sulfur recovery process includes a first stage comprising contacting a first feed gas stream comprising a mixture of $H_2S$ and an initial incremental of an $O_2$-containing gas with a first catalyst portion. The catalyst bed comprises multiple catalyst portions and has activity for catalyzing the partial oxidation of $H_2S$ to elemental sulfur and water. As a result of such contacting, a first stage product gas mixture is formed. The initial incremental amount of $O_2$-containing gas contains less than the stoichiometric amount of $O_2$ in reaction 5, above, to convert all of the $H_2S$ in the first feed gas stream. In the first stage of the process a first stage product gas stream comprising elemental sulfur, steam and unreacted hydrogen sulfide is produced. Following the first stage of the process is a second stage that comprises contacting the first stage product gas stream with a second catalyst portion, and combining a second amount or increment of $O_2$-containing gas with the first stage product gas stream. The second incremental amount of $O_2$-containing gas preferably contains less than the stoichiometric amount of $O_2$ in the reaction to convert all of the unreacted $H_2S$ from the first stage product gas stream to $S^0$ and $H_2O$, whereby a second stage product gas stream comprising $S^0$, $H_2O$ and unreacted $H_2S$ is created. In some embodiments the process also includes a third stage in which a third incremental amount of $O_2$-containing gas is combined with the second stage product gas stream. The third incremental amount of $O_2$-containing gas contains less than the stoichiometric amount of $O_2$ in the reaction to convert all of the unreacted $H_2S$ in the second stage product gas stream to $S^0$ and $H_2O$. From this third stage of the process a third stage product gas stream comprising $S^0$, $H_2O$ and unreacted $H_2S$ is obtained.

In some embodiments of the process the concentration of $O_2$ in the initial feed gas mixture and the amount of $O_2$ provided in the second incremental amount of $O_2$-containing gas are regulated such that at least 85% of the $H_2S$ component of the initial feed gas mixture is converted to $S^0$ and $H_2O$ by the first and second stages together.

In certain embodiments, the process includes regulating the concentration of $O_2$ in the initial feed gas mixture, regulating the amount of $O_2$ provided in the second incremental amount of $O_2$-containing gas, and regulating the amount of $O_2$ provided in the third incremental amount of $O_2$-containing gas, such that at least 90% of the $H_2S$ component of the initial feed gas mixture is converted to $S^0$ and $H_2O$ by the first, second and third stages together. Preferably the product gas mixture contains less than 5% of the $H_2S$ component of the initial feed gas stream as $H_2S$, at least 90% of the $H_2S$ component of the initial feed gas stream as $S^0$, and less than 10% of the $H_2S$ component of the initial feed gas stream as $SO_2$, by volume. By contrast, without staged oxygen the product gas mixture would typically contain up to 15% of the $H_2S$ component of the initial feed gas stream as unreacted $H_2S$, 70–75% of the $H_2S$ component of the initial feed gas stream as $S^0$, and 8–12% of the $H_2S$ component of the initial feed gas stream as $SO_2$, by volume.

Certain embodiments of the process include maintaining a $O_2:H_2S$ molar ratio of less than 0.5 in the initial feed gas stream when contacting the initial catalyst portion. In certain preferred embodiments the process also includes establishing a $O_2:H_2S$ molar ratio in the range of 0.30 to 0.43 at the beginning of each of the first, second and third stages.

In certain embodiments, the sulfur recovery process also includes passing the second or third stage product gas mixture into a cooling zone and cooling the gas mixture sufficiently to form liquid sulfur and a desulfurized effluent gas stream. Preferably the gas mixture is cooled to a temperature above the dewpoint of sulfur, to provide a partially cooled product stream, and then passing the partially cooled product stream into a sulfur condenser and further cooling the partially cooled product stream to the dewpoint temperature of gaseous elemental sulfur, or lower, but above the melting point of solid sulfur, such that the liquid phase of the sulfur product is favored. Liquid sulfur can be withdrawn from the sulfur condenser.

In certain embodiments, the sulfur recovery process includes maintaining the temperature of each catalyst portion above 300° C., preferably above 500° C. but less than 1,500° C. More preferably the catalyst temperature is maintained in the range of 700–1,300° C. In certain embodiments, the $H_2S$-containing gas stream is preheated before contacting the first catalyst portion. In certain embodiments, the $H_2S$ feed gas stream is heated to about 200° C.

In certain embodiments, the process includes operating the process at a space velocity of at least about 20,000 $h^{-1}$. Some embodiments of the process comprise operating the reactor at superatmospheric pressure, and in some embodiments a catalyst contact time of no more than about 200 milliseconds is maintained.

In certain embodiments of the process the catalyst comprises Pt, Rh, Ru, Ir, Ni, Pd, Fe, Sn, Cr, Co, Re, Rb, V, Bi or Sb, or a combination of any of those metals, preferably Pt, Rh or a mixture thereof, more preferably a Pt—Rh alloy. The catalyst may also contain at least one alkaline element (i.e., Mg, Ba or Ca) and/or one or more lanthanide element (i.e., La, Ce, Pr, Nd, Pm, Sm, Eu, Gd, Th, Dy, Ho, Er, Tm, Yb or Lu, or some combination of those elements), preferably Mg, Sm, Yb or Pr.

In some embodiments the catalyst employed in the sulfur recovery process comprises platinum and either magnesium oxide or samarium oxide. In some embodiments the catalyst comprises rhodium and samarium oxide. In some embodiments the catalyst comprises a refractory support chosen from the group consisting of one or more oxides of Al, Zr, Mg, Ce, Si, La, Sm and Yb. In certain embodiments the catalyst comprises a platinum-rhodium alloy deposited on a lanthanide oxide coated refractory support, preferably a samarium oxide coated refractory support, or comprises a platinum-rhodium alloy on an alkaline earth oxide coated refractory support, preferably an magnesium oxide coating. In still other embodiments, the catalyst comprises at least one carbided metal such as a carbided platinum-rhodium alloy deposited on a magnesium oxide coated refractory support. The catalyst used in the process can have a gauze or monolith structure or can have a divided structure made up of a plurality of units. The units can comprise, for example, particles, granules, beads, pills, pellets, cylinders, trilobes, extrudates or spheres. In certain embodiments each particle or unit is less than 25 millimeters in its longest dimension, and in some embodiments less than 10 millimeters.

In accordance with another aspect of the present invention, a sulfur recovery system is provided that comprises a reactor having multiple reaction zones in serial flow arrangement. Each reaction zone comprises a catalyst having activity for catalyzing the partial oxidation of $H_2S$ to elemental sulfur and water in the presence of $O_2$, and each reaction zone has an inlet for introducing an $O_2$-containing gas stream into the respective reaction zone. Preferably the reactor is capable of withstanding the highest temperature that the partial oxidation process may produce, e.g., at least about 1,500° C. The system also includes a cooling zone comprising a sulfur condenser that has a liquid sulfur outlet and a desulfurized gas outlet. In certain embodiments the cooling zone comprises a plurality of thermally conductive tubes, and preferably includes at least one thermal insulator between the reaction zone and the thermally conductive tubes. In some embodiments the thermal insulators comprise ferrules that are made of a refractory material and which are attached to the thermally conductive tubes. In certain embodiments the cooling zone comprises a heat exchanger such as, for example, a boiler.

In certain embodiments the system also includes at least one tail gas treatment unit, and in some embodiments a heater is disposed between the desulfurized gas outlet and the tail gas treatment unit. These and other embodiments, features and advantages of the present invention will become apparent with reference to the following description and drawings.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

High oxygen concentration in the $O_2$/$H_2S$ reactant gas mixture that is fed to the catalytic partial oxidation reactor causes undesirable $SO_2$ formation. An $SO_2$ yield of 8–12% has been observed even under stoichiometric air/$H_2S$ conditions of Reaction 5 (i.e., 2.4). This indicates that a part of the $H_2S$ feed is oxidized to $SO_2$ because of the oxygen rich atmosphere seen in the radiation shield (e.g., alumina) and/or at the shield-catalyst interface. Only the remainder of the $H_2S$ enters the catalyst bed. In other words, the air that is added at the front of the reactor is used up quickly and the oxidation to $SO_2$ occurs at the front of the catalyst bed. Thus, minimizing the $SO_2$ yield is less dependent on the flow rates employed, but is more dependent on the oxygen/$H_2S$ ratio. A series of tests were performed to establish the feasibility of staging oxygen addition in the catalytic partial oxidation process in order to reduce or eliminate $SO_2$ formation. Those tests are described below in the Examples. In accordance with the results of those tests, a staged oxygen addition reactor configuration and process have been devised. Generally described, the process includes introducing a controlled amount of air with the $H_2S$ feed to the front of the catalyst bed. The controlled amount is preferably just enough to minimize $SO_2$ production, i.e., low air/$H_2S$ ratio (about 1.4–2.0, preferably no more than about 2.4). Air is added in an incremental or staged manner along the catalyst bed so that the reaction is always $O_2$-limited, and thus selective for primarily $S^0$ product. Preferably the air/$H_2S$ ratio at each subsequent stage is also maintained at about 1.4–2.0. Staged oxygen addition to the $H_2S$ catalytic partial oxidation process will increase net $H_2S$ conversion and $S^0$ yield, and will decrease $SO_2$ yield. Preferably selectivity for $SO_2$ is less than 10%, more preferably less than 5% and still more preferably less than 1%. The temperature at the front of the catalyst bed will also be lower when $SO_2$ is not being produced. Overall, the $O_2$ requirement for the process is also reduced.

Figure 1:
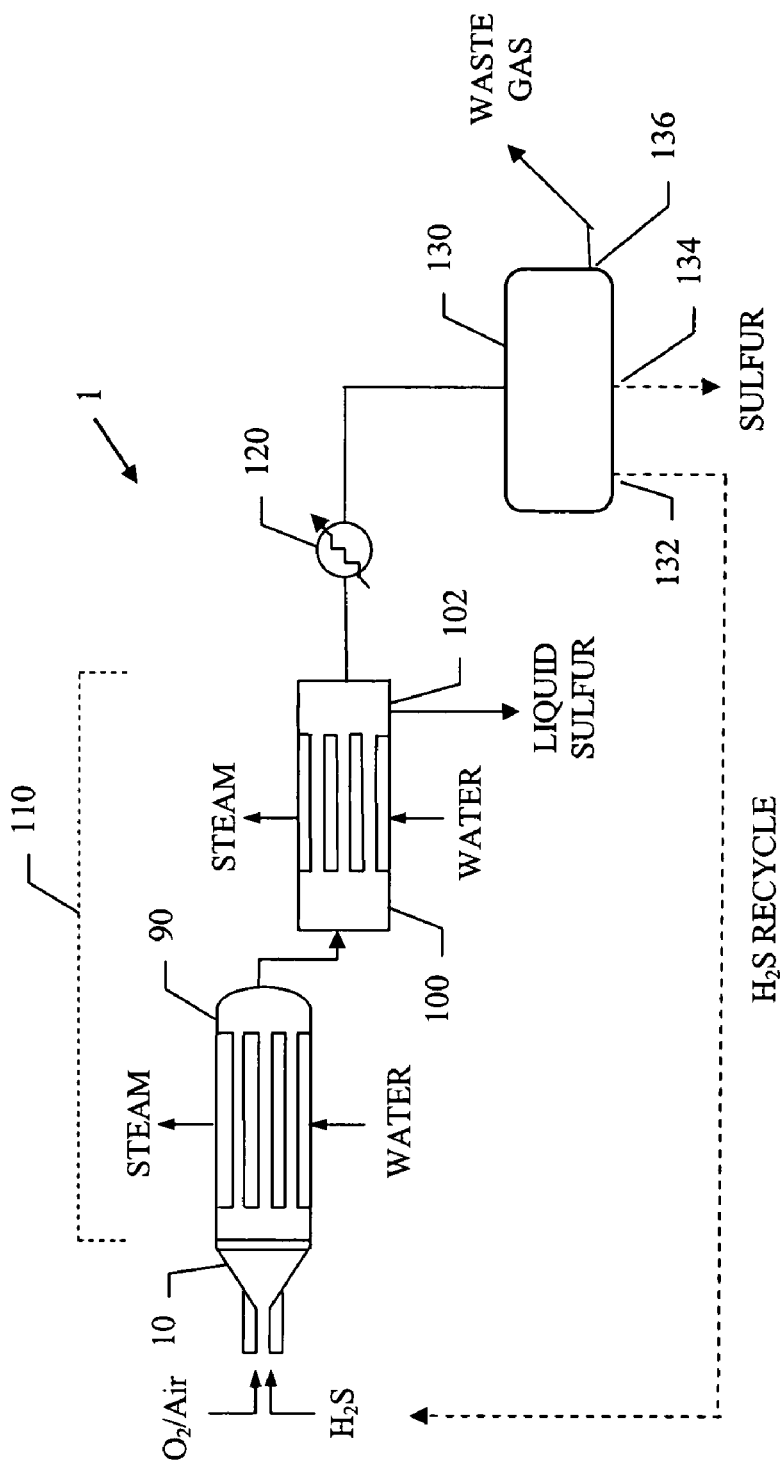
FIG. 1 is a schematic representation showing the components of a preferred embodiment of a sulfur recovery system according to the present invention.

A basic SPOC-III™ sulfur recovery system 1, shown in FIG. 1, includes reactor 10 and cooling zone 110. Cooling zone 110 includes a heat exchanger 90 and a sulfur condenser 100. Depending on the purity of the $H_2S$ stream, the particular contaminating gases included in the feedstock, and the purity requirements for the emerging gas stream, the system may also include a heater 120 and one or more tail gas clean up unit 130. The reactor is preferably similar to the short contact time (i.e., 200 milliseconds or less)/fast quench (i.e., less than one second) reactors that are used for carrying out the catalytic partial oxidation of light hydrocarbons and the catalytic partial oxidation of hydrogen sulfide, as described in co-owned U.S. Pat. No. 6,403,051. In the present case, the reactor is modified to provide for introduction of oxygen or an $O_2$-containing gas incrementally and at desired intervals along the catalyst bed.

Figure 2:
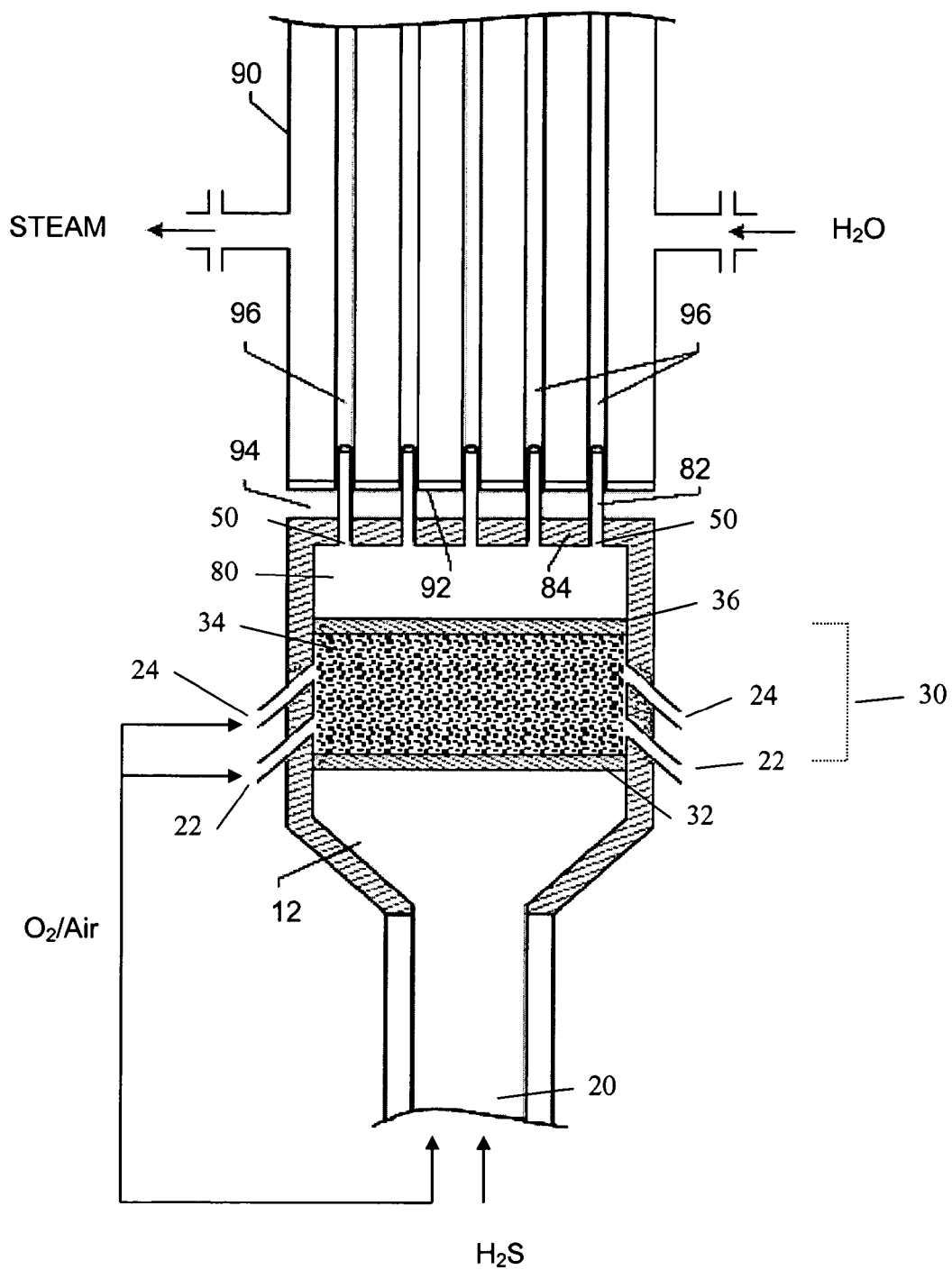
FIG. 2 is a schematic representation showing in cross-section a partial oxidation reactor adapted for three-stages of oxygen/air addition, in accordance with an embodiment of the present invention.

FIG. 2 illustrates schematically an enlarged cross-sectional view of a staged oxygen addition reactor 10 of FIG. 1, together with a portion of cooling zone 110. Very generally described, the reactor is essentially a tube made of materials capable of withstanding the temperatures generated by the exothermic catalytic partial oxidation reaction (Reaction 5, above). Reactor 10 includes a feed gas inlet 20, a reaction zone 30, a reacted gas zone 80 and at least one product gas outlet 50. Reaction zone 30 preferably includes a thermal radiation shield or barrier 32 positioned immediately upstream of a catalyst 34 in a fixed-bed configuration. Radiation barrier 32 (also referred to as a thermal shield) is preferably a porous ceramic or refractory material that is suited to withstand the reactor operating temperatures and provide sufficient thermal insulation to the feed gas mixture to prevent gas phase reactions (pre-ignition) before reaching the catalyst 34 in zone 30. Suitable refractory barrier materials (e.g., alpha alumina) are well known in the art. A second barrier 36, which may be the same as barrier 32, is preferably positioned on the downstream side of catalyst 34 (catalyst floor) to retain the catalyst bed, as discussed in more detail below. In commercial scale operations the reactor is constructed of or lined with any suitable refractory material that is capable of withstanding the temperatures generated by the exothermic catalytic partial oxidation reaction. At intervals along the catalyst 34 are one or more $O_2$ inlets 22, 24. In a preferred configuration schematically shown in FIG. 2, oxygen is introduced in three stages through a first inlet 20 and supplementary inlets 22 and 24.

Downstream from reaction zone 30 is reacted gas zone 80 which includes at least one outlet 50 for the product gases from reaction zone 30. Barrier 36 is preferably capable of providing sufficient thermal insulation to the product gas mixture 38 leaving reaction zone 40 to permit the gases to begin cooling in reacted gas zone 80 as they move rapidly toward the reactor outlet 50. Catalyst 34 is positioned in reaction zone 30 in the flow path of the feed gas mixture introduced via inlet 20, and can have any suitable geometry. For example, it could be in the form of one or more layers of wire gauze, a monolith, or a bed of discrete or divided structures held between two porous refractory disks (radiation barriers 32,36). Suitable catalyst compositions are described in more detail below in the subsection entitled "$H_2S$ Partial Oxidation Catalysts."

As shown in FIG. 2, reactor 10 includes an inlet 20 for the feed gas mixture containing $H_2S$ and an initial increment of $O_2$. The feed gases may be introduced as a mixture or fed separately and mixed upstream from the first reaction zone 30. A static mixer, such as a group of vanes projecting from the walls of a concentric perforated pipe, may be employed. At least one separate $O_2$ injection opening is positioned at (a) predetermined point(s) along the catalyst. In a preferred configuration, a pair of $O_2$ inlets 22 are positioned downstream from the top of the catalyst and another pair of $O_2$ inlets 24 are located downstream from inlets 22. It should be understood that the configuration of the reactor and the position of the feed injection openings could be configured in a variety of ways without affecting the principles or operation of the present system, as long as staged or incremental addition of oxygen to sequential portions of the catalyst is provided for.

Adjacent reactor outlet(s) 50 is a heat exchanger 90, which can be a waste heat or fire tube boiler, for cooling the second stage product gas mixture. Heat resistant ferrules 82 are embedded in refractory material 84 that lines at least the reaction zone and adjacent portions of reactor 10 that are exposed to high temperatures (e.g., 1,300° C. or more). Tube sheet 94 is a divider between the hot product gases and the boiling water where the second stage product gas mixture exits the reactor and enters heat exchanger 90, and contains a plurality of thermally conductive tubes 96 that extend from the process (reacted) gas outlet 50 of reactor 10 through heat exchanger 90. The tube sheet 94 and tubes 96 are preferably made of carbon steel. Since the carbon steel of the tubes and tube sheet cannot stand the high temperatures of the process gas, which can reach 1,300° C. or more, temperature protection for the metal is needed. Ferrules 82 connect to tubes 96 and, together with tube sheet 94, force the product gas mixture to exit the reactor by going through the inside of tubes 96, and heat exchanger 90 includes an outlet for steam. Water that is contained by the shell of the heat exchanger surrounds the outside of tubes 96. For most of tube sheet 94, including tubes 96, this protection is afforded by the boiling water. Preferably ferrules 82 are made of a refractory ceramic material and extend into tubes 96 as far as necessary to protect the metal tubing from exposure to excessively high temperatures.

Referring again to FIG. 1, following heat exchanger 90 is a sulfur condenser 100 for further cooling the process gas and providing for the removal of liquid sulfur product. In processes in which the cooled syngas mixture that emerges from condenser 100 still contains an undesirable amount of unreacted $H_2S$ or other sulfur-containing gas, the assembly may further include a heater 120 and at least one tail gas cleanup unit 130. Tail gas cleanup unit 130 can include a hydrogenation stage followed by water removal, $H_2S$ absorption, and recycle of the $H_2S$ (Shell SCOT™ or Parsons BSR-MDEA™, for example), or cleanup unit 130 may include an incinerator followed by $SO_2$ absorption (WELLMAN-LORD™, bisulfite salt or thiosulfate salt, for example), or liquid phase oxidation to sulfur by iron salts (LO-CAT™ or vanadium salts (STRETFORD™, for example), to meet regulatory emissions requirements.

Process for Recovering Sulfur from an $H_2S$-Containing Stream

In an exemplary mode of operation the above-described apparatus is set up at a refinery to receive a waste gas stream that contains a level of $H_2S$ that is too great to be safely released into the atmosphere. In operation, a reactant gas mixture containing $H_2S$ and a less-than-stoichiometric amount, A, (where A=molar ratio $O_2$:$H_2S$) of $O_2$ enters reactor 10 at inlet 20, as shown in FIG. 2. The $H_2S$ containing stream and the initial or first stage $O_2$-containing stream may be introduced together as a rapidly flowing reactant gas mixture or they may be fed separately into the reactor and mixed immediately upstream from reaction zone 30 in mixing zone 12. Molecular oxygen is provided in the form of air, pure oxygen, or an air/oxygen mix. If the $H_2S$-containing gas and the $O_2$-containing gas are introduced separately at the top of reaction zone 30, the feed injection openings can be configured in any of a number of different ways without affecting the principles or operation of the present system. A static mixer, such as a group of vanes projecting from the walls of a concentric perforated pipe, is one suitable option. The reactor may include a mixing zone 12 immediately upstream from barrier 32. Void spaces in the reactor are preferably avoided so as to minimize the occurrence of undesirable gas phase reactions between the feed gas components before entering reaction zone 30. The initial $H_2S$-containing stream may contain, for example, as little as 1% $H_2S$, or it could contain 3–25% $H_2S$ as found in many natural gas formations, or it may even be an acid gas stream containing up to 100% $H_2S$ (by volume). The minimum concentration $H_2S$ in the $H_2S$-containing feed is that which will provide the minimum partial vapor pressure of gaseous elemental sulfur needed to condense sulfur liquid under the selected operating conditions of the process.

In order for sulfur vapor to condense from the vapor phase to the liquid phase, the sulfur in the vapor phase must be in equilibrium with sulfur in the liquid phase. According to Raoult's Law, this occurs where the mole fraction of the sulfur vapor times the total system pressure is equal to the vapor pressure of the sulfur liquid times its mole fraction or:

$$Y_S P_T = X_S P_S^{sat} \quad (6)$$

where $Y_S$=mole fraction of sulfur vapor, $P_T$=total pressure, $X_S$=mole fraction of sulfur vapor over the liquid phase, and $P_S^{sat}$=vapor pressure of pure liquid sulfur. A combination of low $P_T$ of the system and the gas components of the present process make the gas phase behave nearly ideally, hence the use of the Raoult's law simplification.

Thus, at the conditions nominally expected in a process according to Equation 5, the left side of the Raoult equation is merely the partial pressure of the sulfur vapor. Sulfur is the only component of the mixture that would be expected to condense out of the mixture at the temperature of operation of a conventional sulfur condenser, about 260–375° F. Under those conditions, the mole fraction of sulfur in the liquid would be very close to 1. The right side of the equation is then the vapor pressure for sulfur vapor above a saturated sulfur liquid. Thus liquid sulfur could only be present when the partial pressure of sulfur in the vapor phase is equivalent to or greater than the vapor pressure of a saturated sulfur liquid. In accordance with standard published sulfur condensation curves, in a sulfur condenser operated at 260–375° F., and 1 atm pressure, the partial pressure of sulfur required in order to condense any sulfur liquid is between 0.001 and 0.01 atm or 0.001–0.01 mole fraction elemental sulfur vapor at 1 atm pressure.

Prior to contacting the first portion of the catalyst, the feed gas mixture is shielded by radiation barrier 32 from heat that is generated downstream in the process in first reaction zone 30. Preferably the temperature of the feed gas mixture is increased up to about 200° C. to facilitate initiation of the reaction by preheating at least one of the feeds. In addition to manipulating the amount of available oxygen by incremental addition to the process, it is also preferable to keep the gases thoroughly mixed to avoid pockets of high $O_2$ concentration from occurring and to further deter complete oxidation of $H_2S$ from taking place to form undesirable $SO_2$. The contact time between the oxygen and $H_2S$ is also preferably minimized to prevent having a stagnant explosive mixture form in the reactor. Minimum contact time between the $O_2$ and $H_2S$ is facilitated by placing inert filler in any void spaces in the piping upstream of the reaction zone.

The molar ratio of air:$H_2S$ is preferably at least 1.4 but not as much as 2.4 in the initial feed gas mixture (first catalytic stage). A preferred range is 1.4–2.0 air/$H_2S$. In the case of a pure $O_2$ feed, the molar ratio of $O_2$:$H_2S$ in the initial feed gas mixture is at least 0.30 but not as much as 0.5. A preferred range is 0.3–0.43 $O_2/H_2S$. The initial feed gas mixture contacts a first portion of the catalyst (adjacent shield 32) whereupon part of the $H_2S$ content of the flowing stream of gases is converted to $S_0$ and $H_2O$, and the process gas stream then enters a second portion of the catalyst (second catalytic stage). An additional amount of molecular oxygen introduced through one or more inlet 22 and mixed with the rapidly flowing process gas stream as it enters the second catalyst portion. This additional amount of oxygen, (=B× $H_2S$ flow, where "$H_2S$ flow" is the flow rate of the $H_2S$ at the front end of the catalyst bed and "B" is the molar ratio $O_2$:$H_2S$ added to the second stage) is also a less than stoichiometric amount required to partially oxidize the unreacted $H_2S$ carried over from the first stage. The second stage feed gas mixture comprises gaseous elemental sulfur, steam and unreacted $H_2S$ from the first stage. Preferably the molar ratio of $O_2$:$H_2S$ in this second stage feed gas mixture is also at least 0.30 but less than 0.5. As the second stage feed gas mixture flows past the second catalyst portion part of the remaining $H_2S$ is converted to $S_0$ and $H_2O$.

The process gas mixture leaving the second catalytic stage comprises cumulative amounts of gaseous elemental sulfur and steam produced in the first and second catalytic stages and contains a reduced amount of unreacted $H_2S$ compared to the reacted gas mixture leaving the first catalytic stage. Because the partial oxidation reactions in the first and second stages are carried out under relatively oxygen-starved conditions, little or no $SO_2$ is produced at the same time. As depicted in the preferred reactor configuration schematically illustrated in FIG. 2, a further incremental amount of molecular oxygen (=C×$H_2S$ flow, where "$H_2S$ flow" is the flow rate of the $H_2S$ at the front end of the catalyst bed and "C" is the molar ratio $O_2$:$H_2S$ added to the third stage) is introduced through one or more inlet 24 that is aligned with a third portion of catalyst. The oxygen stream, supplying the desired incremental amount of $O_2$, is mixed with the rapidly flowing process gas stream as it enters the second catalyst portion. This additional amount of oxygen is preferably less than or equal to the stoichiometric amount required to partially oxidize the unreacted $H_2S$ remaining from the second stage. Together the first, second and third incremental ratios of oxygen/$H_2S$ supplied in the respective first, second and third catalytic stages preferably add up to 0.5 (i.e., (A+B+C)/$H_2S$ flow <=0.5), thus satisfying the total molar amount of oxygen in the 1:2 $O_2/H_2S$ molar ratio required for the partial oxidation reaction (Equation 5), as set forth above.

In a simple process and reactor configuration the oxygen or air stream is split between the initial inlet and each subsequent inlet or stage so that an equal fraction of the total stoichiometric amount of $O_2$ required to convert the $H_2S$ in the feed gas stream flows into each respective catalyst portion. For example, in a three-stage configuration, each stage may receive ⅓ of the total stoichiometric amount of oxygen required to satisfy the 0.5 molar ratio of the $H_2S$ partial oxidation reaction ("SPOX" reaction). Alternatively, the incremental amount of air or oxygen available at a particular stage could be more or less than that which is provided to another portion of the catalyst, in order to manipulate the yield or selectivity of the process. Staged addition of oxygen to the flowing process gases while contacting sequential portions of catalyst will help reduce the occurrence of unwanted side reactions that might otherwise rapidly occur during or after mixing of $O_2$ with the $H_2S$ but prior to contacting the catalytic surfaces. For instance, in a three-stage process, the first stage may receive molecular oxygen in a molar ratio of 0.30 to 0.43 $O_2/H_2S$ (or 1.4 to 2.0 air/$H_2S$), with respect to the initial $H_2S$ concentration. Each of stages two and three may be fed $O_2$ in molar ratios which together total 0.07 to 0.20 (with respect to the $H_2S$ concentration in the initial feed), such that the total molar ratio of $O_2$ for the process is less than or equal to the desired stoichiometric 0.5 molar ratio $O_2/H_2S$. Preferably the partial oxidation reaction taking place in each stage is oxygen limited to minimize $SO_2$ formation.

The contact time of the feed gas stream with the catalyst is less than about 200 milliseconds, preferably less than 50 milliseconds, and still more preferably less than 20 milliseconds. A contact time of less than 10 milliseconds is highly preferred. When referring to a wire gauze catalyst, the contact time may be calculated as the wire diameter divided by the feed gas stream velocity at inlet conditions (i.e., temperature and pressure at the inlet to the reactor). When employing a catalyst monolith or packed bed of divided catalyst, the surface area, depth of the catalyst bed, and gas flow rate (space velocity) are preferably managed to ensure the desired short contact time (i.e., less that 200 milliseconds). It is well known that contact time is inversely proportional to the "space velocity," as that term is customarily used in chemical process descriptions, and is typically expressed as volumetric gas hourly space velocity in units of $h^{-1}$. Preferably the partial oxidation of $H_2S$ in the first reaction zone is carried out at superatmospheric pressure (i.e., greater than 1 atmosphere (100 kPa), more preferably >2 atmospheres (200 kPa)), and the gas hourly space velocity (GHSV) is at least 20,000 $h^{-1}$, preferably at least 100,000 $h^{-1}$.

After the rapidly moving feed gas mixture passes barrier 32 it flows past catalyst 34 in reaction zone 30 and where it becomes instantaneously heated sufficiently to initiate an oxidation reaction, the temperature quickly reaching the range of 700° C.–1,500° C., preferably 850° C.–1,300° C. as the partial oxidation reaction proceeds. The catalyst bed 34 is heated as a result of the exothermic chemical reaction occurring at its surface and maintains the stated partial oxidation reaction temperature range. It is best to avoid contacting the catalyst at a temperature at or below the dewpoint of sulfur. In some cases it may be helpful to heat catalyst 34 with external means at startup of the process, so as to initiate the exothermic oxidation reactions on the catalyst. This initial heating (e.g., to about 300° C.–500° C.) can also be accomplished by briefly spiking the feed gas mixture with a readily oxidizable gas to heat up the catalyst sufficiently to initiate the $H_2S$ partial oxidation reaction. Once the reactor is running, the partial oxidation reaction is preferably autothermal (i.e., the exothermic partial oxidation reaction supplies the heat needed to perpetuate the partial oxidation reaction). The rapid heating of the reactant gas mixture as a result of contact with the hot catalyst promotes fast reaction rates. Maintaining the preferred <200 millisecond range dwell time of the reactant gas mixture on the catalyst produces a favorable balance between temperature elevation due to the exothermic partial oxidation reaction and the convective removal of heat from the reaction zone 30 by the rapidly moving product gas stream. Thus, sufficient heat is generated to maintain the catalyst temperature in the range of 700° C.–1,500° C., more preferably in the range of about 850° C.–1,300° C.

The catalyzed reaction goes quickly by the direct oxidation of the $H_2S$ to form sulfur and water according to Reaction 5. The most likely value for x in Reaction 5 at the preferred temperatures and pressures of the presently disclosed process is x=2. Small amounts of light hydrocarbon, if present in the $H_2S$ feed, will likely be partially oxidized at the same time to CO and $H_2$ under the $H_2S$ catalytic partial oxidation reaction conditions, if the catalyst in reaction zone 30 possesses at least some activity for catalyzing the CPOX reaction. Preferably the totality of the $H_2S$ catalytic partial oxidation reactions carried out in reaction zone 30 is optimized such that the conversion of the $H_2S$ component to gaseous elemental sulfur is maintained at the maximum possible level (i.e., the produced elemental sulfur is not lost through oxidation to $SO_2$.) Optimization of the reaction includes maintaining the $O_2$ concentration in each catalytic stage at a less-than-stoichiometric $O_2/H_2S$ molar ratio (i.e., less than 0.5). An oxygen-limited, multi-staged $O_2$ addition is preferred for achieving maximum total conversion of $H_2S$ to elemental sulfur without allowing an excessive amount of $SO_2$ formation. By employing the second SPOX stage to partially oxidize the unreacted $H_2S$ carried over from the first stage, the $S^0$ yield is increased to at least 85%. Using the third SPOX stage to convert the small amount of $H_2S$ remaining in the process gas stream, the $S^0$ yield is further increased to at least 90%.

The rapidly flowing gases, containing primarily $S^0$ and $H_2O$ with minimal amounts of $SO_2$, $H_2S$ and $H_2$ exit reaction zone 30 through barrier 36. Preferably the product gas mixture contains less than 5% of the incoming $H_2S$ as $H_2S$, at least 90% of the incoming $H_2S$ as $S^0$ and less than 5% of the incoming $H_2S$ as $SO_2$ by volume. The $H_2S$ catalytic partial oxidation reaction is exothermic, and the reactor is preferably operated adiabatically (i.e., without the loss of heat aside from convective losses in the exiting gas). From reaction zone 30, the reacted gases enter cooling zone 110 (as shown in FIG. 1) which includes the product gas zone 80 followed by a heat exchanger 90 and then a sulfur condenser 100. The barrier 36 shields the reacted gases from the hot catalyst and the temperature of the reacted gases starts to decline in product gas zone 80. In heat exchanger 90 the product gases are cooled in thermally conductive tubes 96 to below 425° C., preferably below about 340° C., but not below the dew point of sulfur. The water surrounding tubes 96 is raised to its boiling point by heat conducted away from the hot gas through tubes 96. It is preferable to capture the evolved steam for secondary use. Since the boiling water remains at a constant temperature, and since the metal conducts heat so readily, tubes 96 and most of tube sheet 94 attain temperatures only slightly above the temperature of boiling water. This is not the case for the portions of tube sheet 94 where tubes 96 connect at joints 92. Without thermal protection, these joints and the first part of the tube would see temperatures far exceeding the safe operating limits for the metal. The refractory covering 84 and heat resistant ferrules 82 provide insulation for these relatively unprotected areas of metal. Thus, only metal surfaces that are adequately exposed to the circulating water will encounter the hot gases. The rapid cooling that occurs in the boiler drops the temperature of the reacted gases to below about 425° C. and thus ceases the chemical reactions. Alternatively, another suitable cooling technique could be employed instead of a boiler. The water vapor, gaseous elemental sulfur, and $CO_2$, plus any incidental gases or combustion products, flow from heat exchanger 90 into sulfur condenser 100, where they are cooled further until the dew point of elemental sulfur is reached.

High levels of conversion and the lack of $SO_2$ in the product stream will usually make it unnecessary to proceed to tail gas treatments in order to achieve an acceptable level of desulfurization in the resulting gas stream. The liquid sulfur that forms in sulfur condenser 90 may be removed from the condenser by way of outlet 102. Under the preferred optimal operating conditions, and when only a minor amount of other gases are present in the $H_2S$ rich gas feed, the desulfurized gas emerging from the condenser may be safely vented into the atmosphere without constituting an environmental burden. In some situations, however, such as where the $H_2S$-containing feedstock contains an appreciable amount of contaminating gases, it may be desirable to remove even very low levels of sulfurous or other components before the residual gases are vented into the atmosphere. In such case, the gas leaving sulfur condenser 90 may be reheated by heater 120 and sent to tail gas treatment unit 130, as shown in FIG. 1, or a series of tail gas treatment units, if necessary for a particular application.

In tail gas unit 130, residual sulfur-containing components are preferably converted to $H_2S$, sulfur or $SO_2$. $H_2S$ from outlet 132 can be recycled to the present process. Sulfur from a tailgas cleanup unit 130 may be recovered from outlet 134 as a solid or liquid and sold as valuable elemental sulfur. $SO_2$ may be absorbed into bisulfite or thiosulfite salt solutions that may be sold. The effluent gas, meeting environmental emissions regulations, may then be discharged at outlet 136 to the atmosphere.

Ensuring $H_2S$ catalytic partial oxidation reaction promoting conditions in the first reaction zone may include adjusting the relative amounts of $H_2S$, $O_2$ and other oxidizable components (e.g., hydrocarbon) in the feed gas mixture. For example, an amount of $O_2$ in excess of the preferred minimum molar ratio of $O_2/H_2S$ stated above is preferably provided if the $H_2S$-containing feed also contains a light hydrocarbon or another oxidizable compound that consumes oxygen under the same process conditions. Reaction promoting conditions may also include adjusting the amount of preheating of the reactant gas mixture and/or the catalyst, adjusting the operating pressure of the reactor, which is preferably maintained above atmospheric pressure, more preferably in excess of two atmospheres pressure. Increasing or decreasing the space velocity of the feed gas mixture, which is influenced not only by pressure but also by the configuration of the catalyst bed, its porosity and the associated pressure drop, also can be used to favor the $H_2S$ partial oxidation reaction.

Although the exemplary process set forth above, and the reactor configuration schematically illustrated in FIG. 2, describe the use of two or three $H_2S$ catalytic partial oxidation stages, it can be readily appreciated that more than three sequential stages could also be used in instances where it is desirable to remove even very small residual amounts of $H_2S$ from the final gas stream. For each added stage one or more oxygen inlet like inlets 22,24 is added at a desired point along the catalyst bed of the reactor for introducing another incremental (less than stoichiometric) amount of oxygen to a further portion of the catalyst. In that case, it may be desirable to reposition the stages closer together along the catalyst bed. While it is preferred to keep the number of air addition stages to less than four, depending on the desired overall S yield, additional air addition stages can be included by choosing suitable catalyst bed length and gas flowrates to avoid excessive pressure drop and capital cost.

By reducing the amount of equipment necessary to obtain a high level of sulfur recovery from an $H_2S$ containing feed gas, the total pressure drop through the sulfur plant can be greatly reduced. Standard air demand analyzers that operate based on measured $H_2S/SO_2$ ratio at the exit of each catalyst stage can be used. As the $H_2S/SO_2$ ratio decreases, $O_2$ addition can be decreased to minimize $SO_2$ formation. Such control can be fed back to the feed flow controllers to achieve high S selectivity and low $SO_2$ selectivity. Since Claus plants are normally limited by the amount of pressure drop due to the low pressure operation, the present system advantageously allows for capacity expansion by the user. The new short contact time sulfur recovery processes and the simplified sulfur process plants described herein are suitable for use in most refinery or gas plant applications such as hydrotreaters, cokers and fluid catalytic crackers where $H_2S$-containing waste gases are typically produced and desulfurization is needed before the waste gas can be safely vented into the atmosphere. As a result of using the present system, there is minimal direct stack emission from the sulfur recovery unit into the air surrounding the plant. Another suitable use for the disclosed apparatus and process is for cleaning up natural gas well effluents at the well site. Such emissions typically contain about 1–5% $H_2S$ by volume and can contain even as much as 25%.

$H_2S$ Partial Oxidation Catalysts

Referring again to FIG. 2, for simplicity the catalyst 34 of first reaction zone 30 is depicted as a particle bed. It could also be one or more wire mesh or gauze layer, a monolith or a divided bed containing any of a variety of geometries. The catalyst is preferably configured so that only a first fraction of the feed gas mixture contacts the catalytically active surfaces while the balance of the reactant gas mixture serves to quickly cool the first fraction and prevent the oxidation reaction from proceeding too far in the first reaction zone. The catalyst may be formed entirely of catalytic material, or it may comprise one or more catalytic components supported on a non-catalytic refractory support. When the catalyst is in the form of a gauze, it is preferably one or more layers of a substantially planar, flexible woven metal-containing or metal-coated screen or gauze having about 20–120 mesh. More preferably, it is a single gauze of metal wires, or a short stack of gauzes, of diameter compatible with the diameter of the reactor. In a laboratory scale reactor about 25 cm in length, the catalysts are preferably about 25 micrometers (µm) to about 2.5 millimeters (mm) in diameter.

Metal Gauzes. One type of catalyst is in the form of one or more layers of substantially planar, flexible woven metal-containing or metal-coated screen or gauze having about 20–120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87–93% by weight (wt %) Pt and about 7–13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on an Alkaline Earth or Lanthanide-modified Refractory Support. Another type of catalyst that is active for catalyzing the direct partial oxidation of $H_2S$ to elemental sulfur comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Th, Dy, Ho, Er, Tm, Yb and Lu), preferably samarium, ytterbium or praseodymium or an alkaline element (i.e., Mg, Ca or Ba) preferably magnesium, in the form of the metal and/or metal oxide coating a refractory monolith or a plurality of distinct or discrete structures or particulates. An especially preferred Rh-Ln catalyst contains about 0.5–10 wt % Rh and about 0.5–10 wt % Sm on a refractory support, especially where the ratio of rhodium to Sm is in the range of about 0.5–2. For example, one active $H_2S$ partial oxidation catalyst is prepared by depositing 2–6 wt % Rh onto a layer of 2–5 wt % Sm which coats a partially stabilized (MgO) zirconia ("PSZ") monolith having about 45–80 pores per linear inch. Weight percents (wt %) refer to the amount of metal component relative to the total weight of the catalyst, including the support, if any. Suitable PSZ monoliths are commercially available from Vesuvius Hi-Tech Ceramics Inc., Alfred Station, N.Y. Other monolith support structures or catalyst configurations include a disk with multiple perforations formed therethrough, a honeycomb-like structure, an etched foil and any other structure that provides the desired amount of transparency to permit the 200 millisecond or less contact time to effect the desired $H_2S$ partial oxidation reaction.

Pt—Rh Alloy. While many of the above-described catalyst compositions have demonstrated good activity for catalyzing the partial oxidation of $H_2S$, and are satisfactory for a number of SPOC™ applications, some metals, such as Rh, suffer from deactivation with extended on stream use due to the formation of sulfur deposits and/or metal sulfide formation that removes the active catalytic form. The surprising discovery was made that this problem is greatly improved or solved completely by combining platinum with rhodium in the catalyst.

Pt—Rh Alloy on an Alkaline Earth or Lanthanide-modified Refractory Support. An especially good catalyst that is highly stable and active for catalyzing the direct partial oxidation of high concentrations of $H_2S$ in a gas stream to elemental sulfur and water contains both platinum and rhodium supported on a samarium-modified refractory support such as the above-described supports and materials. A highly preferred catalyst is prepared by depositing about 0.1%–6 wt % Pt onto about 1–6 wt % Rh, which was previously deposited onto a refractory support that has been coated with about 2–5 wt % lanthanide oxide (preferably samarium oxide) or alkaline earth oxide (preferably magnesium oxide). Weight percent (wt %) is based on total weight of the supported catalyst. A preferred support is alumina granules, more preferably alpha-alumina. In the present investigations, the surprising synergy of the Pt and Rh components enhanced catalyst stability under $H_2S$ catalytic partial oxidation reaction conditions, and when further combined with a lanthanide or alkaline earth oxide modifier provides an even better catalyst for syngas production. Catalyst stability refers to resistant to (a) deactivation due to carbon or sulfur deposition, (b) chemical reaction between sulfur and the catalytic components and (c) volatilization of precious metal at reaction conditions. The stability is typically shown by a consistent and reproducible catalytic performance (e.g., S yield with $H_2S$ feed or syngas yield with light hydrocarbon feed).

The above-described Pt—Rh based catalysts are preferably in the form of either a wire gauze, a foam monolith, or in the form of a catalytically active material dispersed or deposited on a refractory support containing zirconia, alumina, titania, mullite, zirconia-stabilized alumina, MgO stabilized zirconia, MgO stabilized alumina, niobia or a mixture of any of those materials, or another suitable refractory material. For example, the catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"), which is hereby incorporated herein by reference.

A more preferred catalyst geometry comprises granules prepared by impregnating or washcoating the catalytic components, or their precursors, onto lanthanide or alkaline oxide coated refractory granules, calcining and reducing the catalyst, using techniques that are well known in the art. A catalyst bed for a the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles. The supports preferably comprise a refractory material such as zirconia, alumina, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina have also demonstrated satisfactory performance.

The Pt—Rh/Mg and Pt—Rh/Ln catalysts also have superior activity for converting an $H_2S$ stream containing a light hydrocarbon, such as methane, to elemental sulfur and synthesis gas, by way of concurrent CPOX and SPOC™ reactions carried out over the same catalyst in a single reaction zone, operating the reactor at hydrocarbon, $H_2S$ and $O_2$ concentrations and process conditions that favor the formation of both sulfur, CO and $H_2$, as described in co-owned U.S. Pat. No. 6,579,510, which is hereby incorporated herein by reference.

Carbided Pt/Rh on a Refractory Support. Another unexpected discovery was that the gradual deactivation of rhodium, and others among the above-named SPOC™ catalysts, was also improved by carbiding the catalyst under gaseous hydrocarbon flow before, after or during the $H_2S$ flow, under CPOX-promoting reaction conditions. An especially active catalyst that provides improved performance for converting $H_2S$ to sulfur by direct partial oxidation (the $H_2S$ partial oxidation process) is prepared by carbiding a Pt—Rh catalyst before exposing the catalyst to $H_2S$.

The carbiding process includes exposing the catalyst, in any of the forms described above, to light hydrocarbon (a $C_1$–$C_5$ hydrocarbon, preferably methane, ethane, propane or butane) under CPOX reaction conditions as described in co-owned U.S. patent application Ser. No. 10/317,936 filed Dec. 12, 2002. (U.S. Patent Application Publication No. 2003/0129123). Preferably this hydrocarbon pre-treatment procedure (referred to herein as "carbiding") is carried out with the catalyst in place in the short contact time reactor. The carbiding treatment includes heating the catalyst to at least 700° C. or up to about 1,500° C., preferably in the range of 850° C.–1,300° C. in the presence of the light hydrocarbon. Upon getting the catalyst up to CPOX operating temperature, the flow of hydrocarbon is stopped and the flow of $H_2S$ containing gas is begun for sulfur removal and recovery under SPOC-III™ operating conditions. It is preferable to perform the carbiding treatment before exposing the catalyst to $H_2S$ or other sulfur compound while the catalyst is at a temperature at which it can chemically react with sulfur or at which sulfur can condense on its active sites. In the carbiding treatment, it is preferable to mix the hydrocarbon with a small amount of oxygen or $O_2$-containing gas to deter or minimize coking of the catalyst during treatment. The amount of oxygen preferably does not exceed the stoichiometric amount necessary to support catalytic partial oxidation of the hydrocarbon (CPOX reaction), i.e., a carbon:oxygen molar ratio of 2:1. If the catalytic components are also active for catalyzing the CPOX reaction, production of synthesis gas (CO and $H_2$) may commence during the pre-treatment step upon reaching a temperature sufficient to initiate the reaction. Without wishing to be bound by any particular theory, it is believed that, in the case of a Pt—Rh alloy catalyst, the formation of Rh and/or Pt carbide in which at least a substantial portion of the catalytic metal component exists in the same phase with carbon (e.g., $RhC_x$ or $PtC_x$), which resists the formation of metal sulfide(s) that can deactivate the catalyst by covering the active centers. Thus, the stability and life of the catalyst on $H_2S$ stream is increased or enhanced by the carbiding treatment.

The exemplary process described above and schematically depicted in FIG. 2 use for simplicity the same catalyst composition in each of two or three catalytic stages. It is also contemplated that the catalyst composition or the structural characteristics of the catalyst could be different from one stage to another, if desired. For example, to optimize selectivity the second or subsequent stage catalyst could be varied by lowering the Pt wt %. The flow rate could be optimized by making the second or subsequent stage catalysts more porous than the first stage and/or by modifying the size or shape of the catalyst supports.

Test Procedure for Estimating the Effect of Staged $O_2$ Addition

The effect of air/$H_2S$ ratio at constant flow rate on the catalytic partial oxidation of $H_2S$ was determined in a modified conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 80 pores per linear inch) were placed before and after the catalyst as radiation shields. The catalyst bed including the radiation shields was approximately 12 mm in diameter×8 cm in height. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a volumetric oxygen to methane ratio of 0.3–0.5, a preheat temperature of 200–250° C., and a combined flow rate of 2,500–7,000 cc/min (2.5–7 standard liters per minute (SLPM)), corresponding to a gas hourly space velocity (GHSV) of about 100,000–3,000,000 $hr^{-1}$, and at a pressure of 5 psig (136 kPa), except where specific process conditions are stated in the results that are given below. The reactor effluent was analyzed using a gas chromatograph equipped with a thermal conductivity detector.

The catalyst compositions employed in these tests are set out in the Examples which follow. The catalytic activity of representative catalyst compositions described above has been previously established using a similar test procedure, as disclosed in a related U.S. Pat. No. 6,800,269, which is hereby incorporated herein by reference.

The data reported in Table 1 were obtained after approximately 1 hour on stream at the specified conditions. The catalyst was stable under very high GHSV and varying $H_2S$/oxygen ratios. When the various Pt—Sm/$Al_2O_3$, Rh—Sm/$Al_2O_3$, and Pt—Rh—Sm/$Al_2O_3$ compositions described above were tested for their ability to catalyze the direct oxidation of $H_2S$ to $S^0$, the Pt—Rh—Sm combination demonstrated longer catalyst life compared to the samples containing only Pt—Sm or Rh—Sm. Catalyst life was primarily determined by the catalyst's resistance to deactivation due to coking or plugging by sulfide formation. These tests also showed a loss of catalyst performance when Sm was absent from the catalyst composition. Without wishing to be limited to a particular theory, it is believed that Sm deters solid reaction of the catalytic metals and the support material. For example, it is thought that Sm deters formation of metal aluminate compounds from the solid reaction of the Pt and/or Rh with the alumina support at SPOC™ reaction temperatures. The presence of Sm as the support modifier also improves the surface area (i.e., dispersion) of the Pt and/or Rh. The latter property is believed to cause the improved $S^0$ yield during the SPOC™ process. It was also observed that the addition of Sm to the support prior to application of the active metals lowered the reaction initiation (i.e., light off) temperature. Using magnesium in place of samarium provided the same advantages described above, and also offers the advantage of lower cost. In a series of tests of the Pt—Rh/Mg and Pt—Rh/Sm catalysts, contact times of 9 milliseconds and less were obtained, and even a 2 millisecond contact time was obtained under the stated reaction conditions, providing excellent results in each case.

selectivity of the catalytic partial oxidation process over the indicated catalysts was determined. All catalysts were packed using 3/16" thick 80-ppi alpha-alumina foam as the radiation shield, and 5/8" thick 40-ppi alpha-alumina foam as the catalyst floor.

EXAMPLE 1

A catalyst having the composition 1% Rh, 4% Pt, 3% Mg on fused alpha-alumina pills, 4 grams was prepared and tested as described above. The $H_2S$ flow rate was 850 ml/min, or 0.85 SLPM, and the reactant gas preheat temperature was 450° F. (232° C.). The results of those tests are shown in Table 3.

TABLE 1

Catalyst Performance for $H_2S$ Catalytic Partial Oxidation

| | Catalyst composition | $H_2S$ flow (ml/min) | Air flow (ml/min) | $N_2$ flow (ml/min) | $H_2S$ conversion (%) | S yield (%) | $SO_2$ yield (%) | Cause of deactivation |
|---|---|---|---|---|---|---|---|---|
| Without carbiding | 3.9% Rh, 5.1% Sm on 80-ppi alpha-alumina foam (1 gram total weight) | 633<br>892<br>1140<br>1640 | 1519<br>2141<br>2736<br>3936 | 900<br>900<br>900<br>1000 | 75.7<br>78.4<br>79.7<br>79.0 | 63.9<br>65.8<br>65.9<br>62.6 | 11.8<br>12.7<br>13.8<br>16.4 | Sulfur formation on the catalyst (shown by SEM analysis) |
| With carbiding (Propane) | 4.2% Rh, 5.2% Sm on 80-ppi alpha-alumina foam (1 gram total weight) | 1195<br>2195 | 4768<br>5265 | 0<br>0 | 82.2<br>82.7 | 69.4<br>69.7 | 12.9<br>13.0 | No deactivation for the run duration (6 hours) |
| With carbiding (Methane) | 0.5% Pt, 5% Rh, 5% Sm on 1/16" α/γ-alumina extrudates (2 grams total weight) | 761<br>1520 | 1755<br>3498 | 0<br>0 | 82.4<br>82.6 | 72.4<br>71.3 | 10.0<br>11.3 | No deactivation for the run duration (10 hours) |

Note:
S and $SO_2$ yields are calculated as the product of $H_2S$ conversion and S or $SO_2$ selectivity respectively. Nitrogen addition for the non-carbided catalyst was needed to lower the catalyst temperature.

Comparing the performance of the catalysts shown in Table 1, it can be seen that after carbiding a representative monolith supported Rh/Sm catalyst, superior S yield and catalyst stability was obtained despite increasing the flow rates by 100–200%. Without wishing to be bound by any particular theory, it is believed that the formation of metal carbide prevented the formation of sulfur or sulfide species on the catalyst. This, in turn, kept the active components from becoming deactivated and improved the partial oxidation of $H_2S$ to elemental S. Combining Pt with Rh on Sm coated extrudates provided comparable conversion and selectivity and provided even longer life on stream without sulfur deactivation or coking (when light hydrocarbons are also present in the feed).

As mentioned above, a series of tests were performed to establish the feasibility of staging oxygen addition to the catalyst and process gas. In these studies, the effect of the air/$H_2S$ ratio at constant flow rate on the activity and

TABLE 3

Effect of Air/$H_2S$ Ratio on $H_2S$ Conversion and Product Selectivity

| Air/$H_2S$ Ratio | % $H_2S$ Conversion | % Sulfur Yield | % $SO_2$ Yield | % $H_2$ Yield | % $S^0$ Selectivity | % $SO_2$ Selectivity |
|---|---|---|---|---|---|---|
| 2.37 | 84.48 | 72.79 | 11.66 | 6.65 | 86.16 | 13.80 |
| 2.26 | 83.76 | 73.17 | 10.55 | 6.40 | 87.36 | 12.60 |
| 2.16 | 82.77 | 73.65 | 9.09 | 6.46 | 88.98 | 10.98 |
| 2.07 | 81.64 | 73.75 | 7.86 | 6.56 | 90.33 | 9.63 |
| 1.97 | 79.97 | 73.20 | 6.74 | 6.66 | 91.53 | 8.42 |
| 1.87 | 85.61 | 82.09 | 3.50 | 4.29 | 95.89 | 4.09 |
| 1.77 | 76.25 | 71.61 | 4.60 | 6.78 | 93.92 | 6.04 |
| 1.67 | 74.45 | 70.71 | 3.71 | 6.95 | 94.98 | 4.98 |
| 1.57 | 72.11 | 69.08 | 3.01 | 6.95 | 95.79 | 4.17 |

Catalyst: 1% Rh, 4% Pt, 3% Mg on fused alpha-alumina pills

EXAMPLE 2

A catalyst having the composition 1% Rh, 4% Pt, 3% Mg on fused alpha-alumina pills, 4 grams was prepared and tested as described above. The $H_2S$ flow rate was 950 ml/min, or 0.95 SLPM, and the reactant gas preheat temperature was 450° F. (232° C.). The results of those tests are shown in Table 4.

TABLE 4

Effect of Air/$H_2S$ Ratio on $H_2S$ Conversion and Product Selectivity

| Air/$H_2S$ Ratio | % $H_2S$ Conversion | % Sulfur Yield | % $SO_2$ Yield | % $H_2$ Yield | % $S^0$ Selectivity | % $SO_2$ Selectivity |
|---|---|---|---|---|---|---|
| 2.76 | 85.75 | 66.31 | 19.41 | 7.80 | 77.33 | 22.64 |
| 2.66 | 85.11 | 67.17 | 17.91 | 7.97 | 78.93 | 21.04 |
| 2.55 | 84.39 | 68.05 | 16.31 | 8.15 | 80.64 | 19.33 |
| 2.46 | 83.51 | 68.64 | 14.87 | 8.39 | 82.19 | 17.81 |
| 2.36 | 81.59 | 67.50 | 14.08 | 9.00 | 82.74 | 17.26 |
| 2.25 | 81.30 | 69.18 | 12.10 | 8.89 | 85.09 | 14.88 |
| 2.17 | 80.10 | 69.31 | 10.77 | 9.00 | 86.52 | 13.45 |
| 2.06 | 78.87 | 69.45 | 9.40 | 8.91 | 88.05 | 11.92 |
| 1.97 | 77.09 | 68.86 | 8.21 | 8.71 | 89.32 | 10.65 |
| 1.87 | 74.83 | 67.99 | 6.82 | 8.17 | 90.86 | 9.11 |
| 1.77 | 72.22 | 66.39 | 5.81 | 7.41 | 91.92 | 8.05 |
| 1.67 | 69.02 | 63.99 | 5.01 | 6.46 | 92.71 | 7.26 |
| 1.57 | 65.28 | 60.91 | 4.35 | 5.37 | 93.30 | 6.66 |
| 1.47 | 61.24 | 57.38 | 3.84 | 4.22 | 93.70 | 6.26 |
| 1.37 | 57.79 | 54.30 | 3.47 | 3.11 | 93.96 | 6.00 |
| 1.27 | 54.42 | 50.96 | 3.45 | 2.21 | 93.63 | 6.33 |

Catalyst: 1% Rh, 4% Pt, 3% Mg on fused alpha-alumina pills

EXAMPLE 3

A catalyst having the composition 4% Pt, 1% Rh, 3% Mg on MgO granules, 4 grams, was prepared and tested as described above. The $H_2S$ flow rate was 1,050 ml/min, or 1.05 SLPM, and the reactant gas preheat temperature was 450° F. (232° C.). The results of those tests are shown in Table 5.

TABLE 5

Effect of Air/$H_2S$ Ratio on $H_2S$ Conversion and Product Selectivity

| Air/$H_2S$ Ratio | % $H_2S$ Conversion | % Sulfur Yield | % $SO_2$ Yield | % $H_2$ Yield | % $S^0$ Selectivity | % $SO_2$ Selectivity |
|---|---|---|---|---|---|---|
| 2.37 | 84.61 | 73.80 | 10.81 | 4.81 | 87.22 | 12.78 |
| 2.27 | 83.98 | 73.77 | 10.18 | 6.30 | 87.85 | 12.12 |
| 2.17 | 82.41 | 73.26 | 9.13 | 6.58 | 88.89 | 11.08 |
| 2.07 | 80.94 | 72.93 | 7.99 | 6.61 | 90.11 | 9.87 |
| 1.97 | 79.16 | 72.37 | 6.76 | 6.61 | 91.43 | 8.54 |
| 1.77 | 75.74 | 70.72 | 5.01 | 6.34 | 93.36 | 6.61 |
| 1.57 | 71.59 | 68.28 | 3.29 | 6.15 | 95.37 | 4.60 |
| 1.48 | 68.35 | 65.79 | 2.53 | 6.23 | 96.26 | 3.70 |
| 1.38 | 65.67 | 63.64 | 2.00 | 6.16 | 96.91 | 3.05 |

Catalyst: 4% Pt, 1% Rh, 3% Mg on MgO granules

EXAMPLE 4

Figure 3:
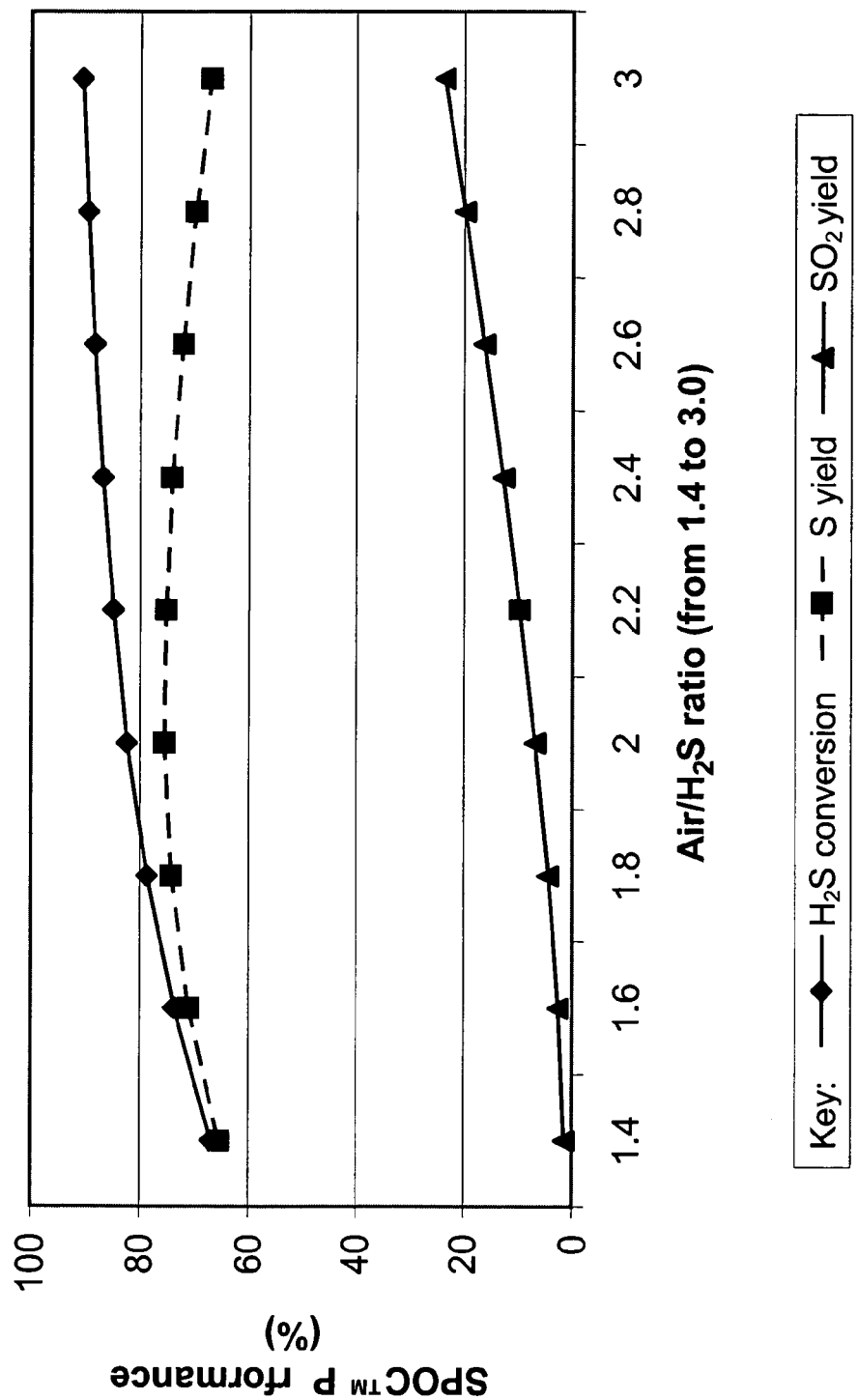
FIG. 3 is a graph showing the performance of a representative catalyst in an $H_2S$ partial oxidation reaction operated over a range of air/$H_2S$ ratios.

A catalyst having the composition 2% Pt, 1% Rh, 2% Mg on MgO granules, 20–30 mesh, 3 grams was prepared and tested using the same laboratory scale reactor set-up as in the preceding examples and $H_2S$ flow rate of 1.75 SLPM. The results of the test are presented in FIG. 3, showing the effect of Air/$H_2S$ ratio on the SPOC™ variables $H_2S$ conversion, sulfur yield and $SO_2$ yield over the range of air/$H_2S$ ratios of 1.4 to 3.0.

EXAMPLE 5

A catalyst having the composition 1% Pt, 4% Rh, 1% Pt, 5% Sm on fused alpha-alumina pills, 4 grams, was prepared and tested as described above. The $H_2S$ flow rate was 950 ml/min, or 0.95 SLPM, and the reactant gas preheat temperature was 450° F. (232° C.). The results of those tests are shown in Table 6.

TABLE 6

Effect of Air/$H_2S$ Ratio on $H_2S$ Conversion and Product Selectivity

| Air/$H_2S$ Ratio | % $H_2S$ Conversion | % Sulfur Yield | % $SO_2$ Yield | % $H_2$ Yield | % $S^0$ Selectivity | % $SO_2$ Selectivity |
|---|---|---|---|---|---|---|
| 2.36 | 86.24 | 73.40 | 12.81 | 6.70 | 85.11 | 14.85 |
| 2.26 | 84.44 | 73.56 | 10.85 | 7.21 | 87.11 | 12.85 |
| 2.16 | 83.67 | 74.16 | 9.48 | 7.35 | 88.63 | 11.33 |
| 2.06 | 82.54 | 74.23 | 8.28 | 7.55 | 89.93 | 10.03 |
| 1.97 | 81.62 | 74.55 | 7.04 | 7.78 | 91.34 | 8.63 |
| 1.87 | 80.40 | 74.44 | 5.93 | 8.04 | 92.58 | 7.38 |
| 1.77 | 78.62 | 73.53 | 5.05 | 8.31 | 93.53 | 6.43 |
| 1.67 | 77.14 | 73.27 | 3.84 | 8.31 | 94.99 | 4.98 |
| 1.57 | 74.48 | 71.15 | 3.30 | 8.25 | 95.53 | 4.43 |
| 1.47 | 71.46 | 68.66 | 2.77 | 7.70 | 96.09 | 3.87 |

Catalyst: 1% Pt, 4% Rh, 1% Pt, 5% Sm on fused alpha-alumina pills

In all of the foregoing examples, it can be seen that as the air/$H_2S$ ratio is decreased, $SO_2$ yield and selectivity decrease with an increase in $S^0$ selectivity. $S^0$ yield, which is a product of $H_2S$ conversion and $S^0$ selectivity remains steady until the air/$H_2S$ ratio is too low. This indicates that using any of these catalysts, a staged air configuration can be devised whereby the $SO_2$ yield is kept to a minimum and $S^0$ yield can be increased to more than 85% in two stages and to more than 90% in three stages. For instance, using the $H_2S$ conversion, S yield and $SO_2$ yield from Table 6 at 1.47 Air/$H_2S$ ratio, the basis shown in Table 7 was developed, assuming that the second and third catalyst stages will have the same performance (i.e., % $H_2S$ conversion, S yield, $SO_2$ yield), as the first stage at a given Air/$H_2S$ ratio.

TABLE 7

THREE-STAGE AIR CONFIGURATION

| | After 1st Stage (actual) | After 2nd stage (calculated) | After 3rd stage (calculated) |
|---|---|---|---|
| Initial H$_2$S flowrate (SLPM) = 0.95 Corresponding air flow rate to the 1st stage = 0.95 × 1.47 = 1.40 SLPM | 1st stage Air/H$_2$S ratio = 1.47 | 2nd stage Air/H$_2$S ratio = 1.47 At 1.47 Air/H$_2$S ratio and 0.27 SLPM H$_2$S to the 2nd stage, corresponding air flowrate to the 2nd stage = 0.27 × 1.47 = 0.40 SLPM | 3rd stage Air/H$_2$S ratio = 1.47 At 1.47 Air/H$_2$S ratio and 0.08 SLPM H$_2$S to the 3rd stage, corresponding air flowrate to the 3rd stage = 0.08 × 1.47 = 0.12 SLPM |
| | S = 68.7% SO$_2$ = 2.8% H$_2$S = 28.5% (This corresponds to 0.285 × 0.95 = 0.27 SLPM H$_2$S exiting 1st stage and going to the 2nd stage) | S = 68.7 + (28.5 × 0.687) = 88.3% SO$_2$ = 2.8 + (28.5 × .028) = 3.6% H$_2$S = 8.1% (This corresponds to 0.081 × 0.95 = 0.08 SLPM H$_2$S exiting 1st stage and going to the 2nd stage) | S = 88.3 + (8.1 × 0.687) = 93.9% SO$_2$ = 3.6 + (8.1 × 0.028) = 3.6% H$_2$S = 2.3% (This will be the exit composition after three SPOC ™ staged air stages. This calculation can be extended for four stages if needed. |

After 2 stages, (Total Air/H$_2$S) ratio=(1.40+0.40)/0.95=1.89 and the S and SO$_2$ yields are 88.3% and 3.6% respectively. This compares with 74.4% and 5.9% yields at the same Air/H$_2$S ratio in a single stage as shown in Table 6.

After 3 stages, (Total Air/H$_2$S) ratio=(1.40+0.40+0.12)/0.95=2.02 and the S and SO$_2$ yields are 93.9% and 3.6% respectively. This compares with 74.2% and 8.3% yields at the same Air/H$_2$S ratio in a single stage as shown in Table 6. These comparisons show that addition of air in stages to the same catalyst bed has the advantage of making the S yields higher and SO$_2$ yields lower, while keeping the total oxygen requirement less than the stoichiometric amount.

In addition to the advantages of reduced SO$_2$ production and increased S$^0$ yield, another advantage is that less air will be required, which in turn allows each stage to be much smaller in size because of the smaller gas volumes flowing, compared to a process and apparatus in which oxygen or air is introduced only in combination with the initial H$_2$S feed.

Definitions. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters.

The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst has sufficient porosity, or sufficiently low resistance to gas flow, to permit a stream of the reactant gas mixture to pass over the catalyst at a gas hourly space velocity (GHSV) of at least about 20,000 hr$^{-1}$, preferably at least 100,000 hr$^{-1}$, when the reactor is operated to recover elemental sulfur from an H$_2$S containing gas.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A multistage catalytic partial oxidation process for recovering elemental sulfur from a H$_2$S-containing gas stream, the process comprising:
   contacting said H$_2$S-containing gas stream with a catalyst that is active for catalyzing the partial oxidation of H$_2$S in the presence of oxygen to form S$^0$ and H$_2$O, said catalyst comprising multiple catalytic regions;
   providing the total stoichiometric amount of oxygen required for the catalytic partial oxidation of the H$_2$S in said H$_2$ S-containing gas stream to S$^0$ and H$_2$O in at least two increments, respectively, to at least two of said catalyst regions, such that a product gas mixture is formed comprising S$_0$ and H$_2$O; and
   condensing elemental sulfur from said product gas mixture.

2. The process of claim 1 comprising maintaining the temperature of each said catalyst portion above 300° C.

3. The process of claim 1 comprising:
a first stage comprising contacting a first feed gas stream comprising a mixture of $H_2S$ and an initial incremental amount of an $O_2$-containing gas with a first catalyst portion, said catalyst comprising multiple portions and having activity for catalyzing the partial oxidation of $H_2S$ to elemental sulfur and water, whereby a first stage product gas mixture is formed, said initial incremental amount of $O_2$-containing gas containing less than the stoichiometric amount of $O_2$ in the reaction

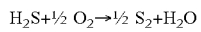

$$H_2S + \tfrac{1}{2} O_2 \rightarrow \tfrac{1}{2} S_2 + H_2O$$

needed to convert all of the $H_2S$ in said first feed gas stream, whereby a first stage product gas stream comprising elemental sulfur, steam and unreacted hydrogen sulfide is obtained;
a second stage comprising contacting said first stage product gas stream with a second catalyst portion following said first catalyst portion;
combining a second incremental amount of $O_2$-containing gas with said first stage product gas stream, said second incremental amount of $O_2$-containing gas containing less than the stoichiometric amount of $O_2$ in said reaction needed to convert all of the unreacted $H_2S$ in said first stage product gas stream to $S^0$ and $H_2O$, whereby a second stage product gas stream comprising $S^0$, $H_2O$ and unreacted $H_2S$ is obtained; and
optionally, a third stage comprising combining a third incremental amount of $O_2$-containing gas with said second stage product gas stream, said third incremental amount of $O_2$-containing gas containing less than the stoichiometric amount of $O_2$ in said reaction needed to convert all of the unreacted $H_2S$ in said second stage product gas stream to $S^0$ and $H_2O$, whereby a third stage product gas stream comprising $S^0$, $H_2O$ and unreacted $H_2S$ is obtained.

4. The process of claim 3 comprising regulating the concentration of $O_2$ in said first feed gas stream and the amount of $O_2$ provided in said second incremental amount of $O_2$-containing gas such that at least 85% of the $H_2S$ component of the initial feed gas mixture is converted to $S^0$ and $H_2O$ by said first and second stages together.

5. The process of claim 3 including said third stage and comprising: regulating the concentration of $O_2$ in said first feed gas stream, regulating the amount of $O_2$ provided in said second incremental amount of $O_2$-containing gas, and
regulating the amount of $O_2$ provided in said third incremental amount of $O_2$-containing gas, such that at least 90% of the $H_2S$ component of the first feed gas stream is converted to $S^0$ and $H_2O$ by said first, second and third stages together.

6. The process of claim 3 comprising maintaining a $O_2$:$H_2S$ molar ratio of less than 0.5 in said first feed gas stream when contacting said first catalyst portion.

7. The process of claim 6 comprising establishing a $O_2$:$H_2S$ molar ratio in the range of 0.30 to 0.43 at the beginning of each of said first, second and third stages.

8. The process of claim 3 comprising:
passing said second or third stage product gas mixture into a cooling zone and cooling said gas mixture sufficiently to form liquid sulfur and a desulfurized effluent gas stream.

9. The process of claim 8 wherein said cooling comprises:
cooling said gas mixture to a temperature above the dewpoint of sulfur, to provide a partially cooled product stream;
passing said partially cooled product stream into a sulfur condenser and further cooling said partially cooled product stream to the dewpoint temperature of gaseous elemental sulfur, or lower, but above the melting point of solid sulfur, such that the liquid phase of said sulfur product is favored; and
withdrawing liquid sulfur from said sulfur condenser.

10. The process of claim 1 comprising maintaining the temperature of said catalyst in the range of 700–1,500° C.

11. The process of claim 10 comprising maintaining the temperature of said catalyst between about 850° C.–1,300° C.

12. The process of claim 1 comprising preheating said $H_2S$-containing gas stream to about 200° C. before contacting said first catalyst portion.

13. The process of claim 1 comprising maintaining a catalyst contact time of no more than about 200 milliseconds.

14. The process of claim 1 comprising operating said process at a space velocity of at least about 20,000 $h^{-1}$.

15. The process of claim 1 comprising operating said reactor at superatmospheric pressure.

16. The process of claim 1 wherein said catalyst comprises a refractory support chosen from the group consisting of one or more oxides of Al, Zr, Mg, Ce, Si, La, Sm and Yb.

17. The process of claim 1 wherein said catalyst comprises at least one metal chosen from the group consisting of Pt, Rh, Ru, Ir, Ni, Pd, Fe, Cr, Co, Re, Rb, V, Bi, Sn and Sb.

18. The process of claim 17 wherein said catalyst comprises Pt, Rh or a mixture thereof.

19. The process of claim 17 wherein said catalyst comprises V, Bi, Sn or Sb.

20. The process of claim 17 wherein said catalyst further comprises at least one lanthanide element chosen from the group consisting of La, Ce, Pr, Nd, Pm, Sm, Eu, Gd, Th, Dy, Ho, Er, Tm, Yb and Lu.

21. The process of claim 17 wherein said catalyst further comprises at least one alkaline element chosen from the group consisting of Mg, Ca and Ba.

22. The process of claim 20 wherein at least one said lanthanide element is Sm, Yb or Pr.

23. The process of claim 20 wherein said catalyst comprises platinum and samarium oxide.

24. The process of claim 21 wherein said catalyst comprises platinum and magnesium oxide.

25. The process of claim 20 wherein said catalyst comprises rhodium and samarium oxide.

26. The process of claim 21 wherein said catalyst comprises rhodium and magnesium oxide.

27. The process of claim 20 wherein said catalyst comprises a platinum-rhodium alloy on a lanthanide oxide coated refractory support.

28. The process of claim 27 wherein said catalyst comprises a samarium oxide coated refractory support.

29. The process of claim 21 wherein said catalyst comprises a platinum-rhodium alloy on a alkaline oxide coated refractory support.

30. The process of claim 29 wherein said catalyst comprises a magnesium oxide coated refractory support.

31. The process of claim 17 wherein said catalyst comprises at least one carbided metal.

32. The process of claim 31 wherein said carbided metal comprises platinum and rhodium.

33. The process of claim 1 wherein said catalyst comprises at least one structure chosen from the group consisting of gauzes, monoliths and a plurality of divided units.

34. The process of claim 33 wherein said divided units comprise particles, granules, beads, pills, pellets, cylinders, trilobes, extrudates or spheres.

35. The method of claim 34 wherein each said divided unit is less than 25 millimeters in its longest dimension.

36. The method of claim 35 wherein each said divided unit is less than 10 millimeters in its longest dimension.

* * * * *